US011980975B2

(12) United States Patent
Saito et al.

(10) Patent No.: US 11,980,975 B2
(45) Date of Patent: May 14, 2024

(54) PROCESSING SYSTEM, PROCESSING METHOD, AND STORAGE MEDIUM

(71) Applicant: KABUSHIKI KAISHA TOSHIBA, Tokyo (JP)

(72) Inventors: Masahiro Saito, Yokohama (JP); Hiromasa Takahashi, Minato (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 838 days.

(21) Appl. No.: 17/017,308

(22) Filed: Sep. 10, 2020

(65) Prior Publication Data

US 2021/0086282 A1 Mar. 25, 2021

(30) Foreign Application Priority Data

Sep. 24, 2019 (JP) .................................. 2019-173466
Aug. 14, 2020 (JP) .................................. 2020-136918

(51) Int. Cl.
*B23K 31/00* (2006.01)
*B23K 9/095* (2006.01)
(Continued)

(52) U.S. Cl.
CPC .......... *B23K 9/0953* (2013.01); *B23K 9/0956* (2013.01); *B23K 31/125* (2013.01); *G06T 7/0004* (2013.01); *G06T 2207/10132* (2013.01)

(58) Field of Classification Search
CPC .. B23K 9/0953; B23K 9/0956; B23K 31/125; G06T 7/0004; G06T 2207/10132;
(Continued)

(56) References Cited

U.S. PATENT DOCUMENTS 3,678,736 A    7/1972  May
4,099,045 A *  7/1978  Okuda ................. G01N 29/343
                                                       219/109
(Continued)

FOREIGN PATENT DOCUMENTS

CA    3097601 A1 * 10/2019 ........... G01N 29/043
CN    1492999 A  *  4/2004 ........... B06B 1/0622
(Continued)

OTHER PUBLICATIONS

Akira Ushijima, et al., "Spot Welding Inspection Robot Achieving LaborSaving and Improvement of Reliability Using 3D Ultrasonic Inspection Equipment", TOSHIBA Review, vol. 74,No. 4, 2019, 9 pages (with Machine Generated English Translation).
(Continued)

*Primary Examiner* — Kiley S Stoner
(74) *Attorney, Agent, or Firm* — Oblon, McClelland, Maier & Neustadt, L.L.P.

(57) ABSTRACT

According to one embodiment, a processing system includes a processing device. The processing device performs at least a first determination of determining whether or not a detector contacts a welding object. The detector includes a plurality of detection elements arranged in a first direction. The detector transmits an ultrasonic wave toward the welding object and detects a reflected wave. The first determination is based on a detection result when the reflected wave is detected by the detector.

16 Claims, 26 Drawing Sheets

(51) Int. Cl.
  *B23K 31/12* (2006.01)
  *G06T 7/00* (2017.01)
(58) Field of Classification Search
  CPC ....... G01N 2291/044; G01N 2291/106; G01N 2291/267; G01N 29/11
  USPC .................................. 228/8–9, 103–104
  See application file for complete search history.

(56) References Cited

U.S. PATENT DOCUMENTS

| | | | | |
|---|---|---|---|---|
| 4,173,898 | A * | 11/1979 | Forstermann | G01N 29/48 73/612 |
| 9,134,280 | B2 * | 9/2015 | Cataldo | G01N 29/4445 |
| 11,112,388 | B2 * | 9/2021 | Garlepp | G10K 11/346 |
| 2003/0167849 | A1 * | 9/2003 | Yamamoto | G01N 29/343 73/620 |
| 2004/0245315 | A1 | 12/2004 | Maev et al. | |
| 2008/0210009 | A1 | 9/2008 | Tanishiki | |
| 2009/0178482 | A1 | 7/2009 | Hough et al. | |
| 2010/0031750 | A1 | 2/2010 | Spencer et al. | |
| 2011/0000299 | A1 | 1/2011 | Isobe et al. | |
| 2012/0243771 | A1 | 9/2012 | Matsumoto et al. | |
| 2014/0165730 | A1 * | 6/2014 | Na | G01N 29/0645 73/588 |
| 2016/0320344 | A1 | 11/2016 | Spencer et al. | |
| 2017/0276651 | A1 | 9/2017 | Hall | |
| 2020/0003735 | A1 | 1/2020 | Ushjima et al. | |
| 2020/0018727 | A1 | 1/2020 | Ono et al. | |
| 2020/0209195 | A1 * | 7/2020 | Kitazawa | G01N 29/262 |
| 2020/0363377 | A1 | 11/2020 | Saito et al. | |
| 2021/0353261 | A1 * | 11/2021 | Ebata | A61B 8/085 |

FOREIGN PATENT DOCUMENTS

| | | | | |
|---|---|---|---|---|
| CN | 105637358 A * | 6/2016 | ............. | G01N 29/04 |
| CN | 108024795 A * | 5/2018 | ............. | A61B 8/145 |
| CN | 108693254 A * | 10/2018 | ............. | G01H 11/08 |
| CN | 110118822 A * | 8/2019 | ............. | G01H 5/00 |
| CN | 110231410 A * | 9/2019 | ............. | G01N 29/075 |
| CN | 110514744 A * | 11/2019 | ............. | A47L 9/2826 |
| CN | 111065918 A * | 4/2020 | ............. | G01B 17/00 |
| CN | 111948285 A * | 11/2020 | ............. | G01N 29/041 |
| CN | 112022202 A * | 12/2020 | ............. | A61B 8/4245 |
| CN | 113176338 A * | 7/2021 | ............. | G01N 29/041 |
| DE | 102004027305 B4 * | 6/2016 | ............. | G01N 29/262 |
| EP | 1357381 A1 * | 10/2003 | ............. | G01N 29/043 |
| EP | 3070467 A1 * | 9/2016 | ............. | B23P 6/00 |
| EP | 3786633 A1 * | 3/2021 | ............. | G01N 29/0618 |
| JP | 56-164953 A | 12/1981 | | |
| JP | 2-132368 A | 5/1990 | | |
| JP | H05172791 A * | 7/1993 | | |
| JP | 10-216955 A | 8/1998 | | |
| JP | H1151911 A * | 2/1999 | | |
| JP | 11-153583 A | 6/1999 | | |
| JP | H11211701 A * | 8/1999 | | |
| JP | 2000338091 A * | 12/2000 | ............. | G01N 29/07 |
| JP | 2001108661 A * | 4/2001 | | |
| JP | 2002014082 A * | 1/2002 | | |
| JP | 2002323481 A * | 11/2002 | ............. | G01N 29/0609 |
| JP | 2003-322646 A | 11/2003 | | |
| JP | 2006-220608 A | 8/2006 | | |
| JP | 2007-232525 A | 9/2007 | | |
| JP | 2007-278809 A | 10/2007 | | |
| JP | 2008-51645 A | 3/2008 | | |
| JP | 2009-145229 A | 7/2009 | | |
| JP | 2009-204327 A | 9/2009 | | |
| JP | 2011-203126 A | 10/2011 | | |
| JP | 2012-247262 A | 12/2012 | | |
| JP | 2012-251842 A | 12/2012 | | |
| JP | 3189500 U | 3/2014 | | |
| JP | 2016-8845 A | 1/2016 | | |
| JP | 2018-513976 A | 5/2018 | | |
| JP | 2019-82403 A | 5/2019 | | |
| JP | 2019-90727 A | 6/2019 | | |
| JP | 6629393 B1 | 1/2020 | | |
| JP | 6658603 B2 * | 3/2020 | ............. | G01N 29/04 |
| JP | 2020-187005 A | 11/2020 | | |
| KR | 20200091161 A * | 7/2020 | | |
| RU | 2592044 C1 * | 7/2016 | ............. | G01B 17/06 |
| WO | WO-2007116629 A1 * | 10/2007 | ............. | B23K 20/123 |
| WO | WO-2011068084 A1 * | 6/2011 | ............. | G01N 29/0672 |
| WO | WO-2015126787 A1 * | 8/2015 | ............. | B23K 11/08 |
| WO | WO-2016051148 A1 * | 4/2016 | ............. | A61B 8/4254 |
| WO | WO2016/164457 A1 | 10/2016 | | |
| WO | WO 2019/150952 A1 | 8/2019 | | |

OTHER PUBLICATIONS

Masafumi Matsumura, et al., "ImageRecognition Techniques Enabling Precise Understanding for Robots", TOSHIBA Review, vol. 74, No. 4, 2019, 6 pages (with Machine Generated English Translation).

* cited by examiner

_US 11,980,975 B2_

PROCESSING SYSTEM, PROCESSING METHOD, AND STORAGE MEDIUM

CROSS-REFERENCE TO RELATED APPLICATIONS

This application is based upon and claims the benefit of priority from Japanese Patent Application No. 2019-173466, filed on Sep. 24, 2019; and Japanese Patent Application No. 2020-136918, filed on Aug. 14, 2020; the entire contents of which are incorporated herein by reference.

FIELD

Embodiments described herein relate generally to a processing system, a processing method and a storage medium.

BACKGROUND

In welding, portions of two or more members are joined to each other by melting. The welded members are inspected for whether or not the welded portion (hereinbelow, called the weld portion) is joined appropriately. For example, in a non-destructive inspection, a human (an inspector) that grips a detector causes the detector to contact the weld portion. An ultrasonic wave is transmitted from the detector toward the weld portion, and the existence or absence of the joint is inspected based on the reflected wave.

In the inspection, a reflected wave that reflects the state of the weld portion cannot be detected if the detector does not contact the weld portion appropriately. Accordingly, when inspecting, it is desirable for the detector to appropriately contact the weld portion.

DETAILED DESCRIPTION

Figure 1:
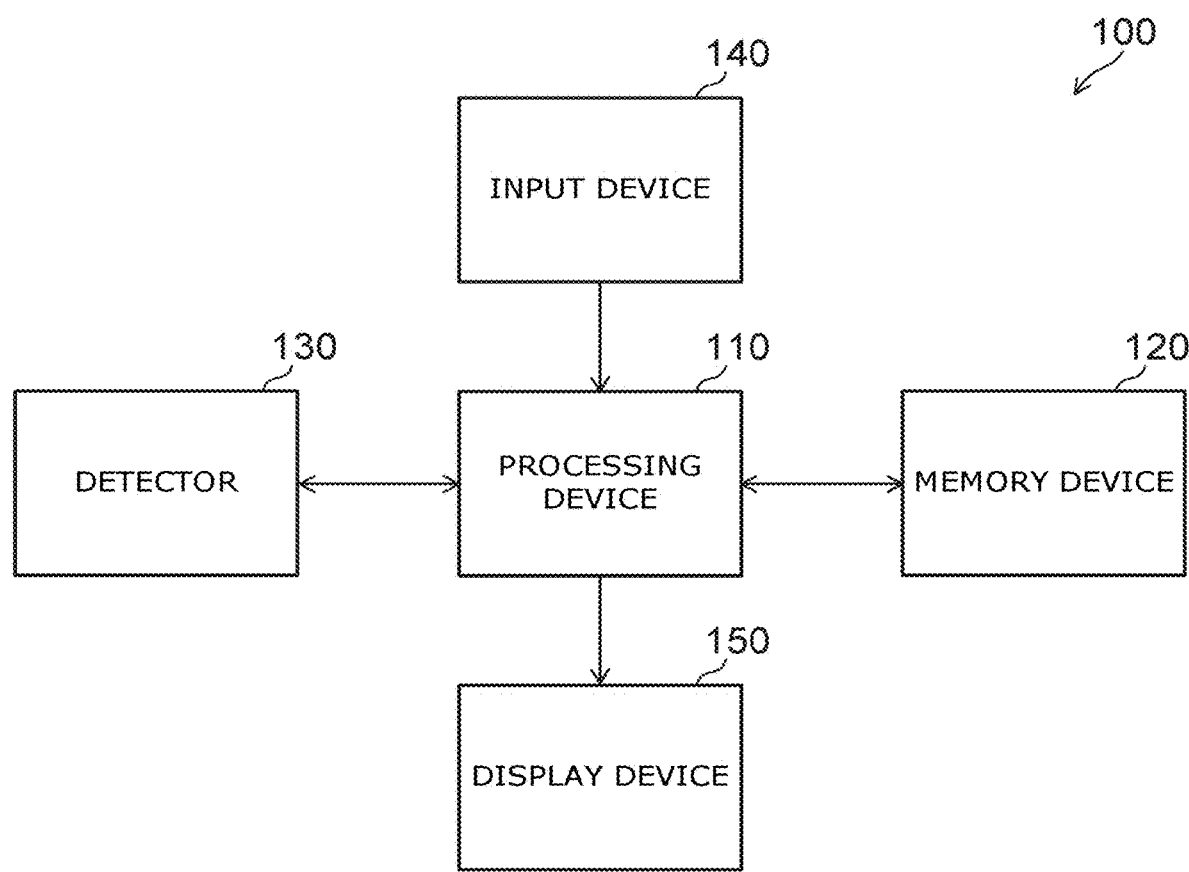
FIG. 1 is a block diagram illustrating a configuration of a processing system according to an embodiment.

According to one embodiment, a processing system includes a processing device. The processing device performs at least a first determination of determining whether or not a detector contacts a welding object. The detector includes a plurality of detection elements arranged in a first direction. The detector transmits an ultrasonic wave toward the welding object and detects a reflected wave. The first determination is based on a detection result when the reflected wave is detected by the detector.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a block diagram illustrating a configuration of a processing system according to an embodiment.

As illustrated in FIG. 1, the processing system 100 according to the embodiment includes a processing device 110 and a memory device 120. The memory device 120 stores data relating to a weld inspection. The processing device 110 processes the data relating to the weld inspection.

The processing system 100 illustrated in FIG. 1 further includes a detector 130, an input device 140, and a display device 150. The detector 130 transmits an ultrasonic wave toward an object and detects (receives) a reflected wave. The detector 130 includes, for example, a probe. Hereinafter, the transmission of the ultrasonic wave and the detection of the reflected wave by the detector 130 is called probing.

The processing device 110 performs various processing based on the detected reflected wave. For example, the processing device 110 causes the display device 150 to display a user interface. The user easily can confirm data obtained by the processing via the user interface displayed by the display device 150. Also, the user can input data to the processing device 110 via the user interface by using the input device 140.

Here, the weld inspection will be described in detail. A non-destructive inspection of the weld portion is performed in the weld inspection.

Figure 2:
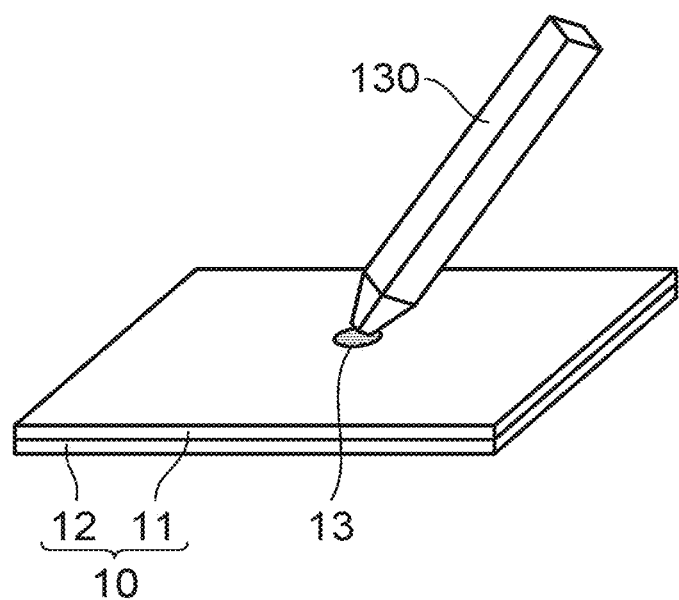
FIG. 2 is a schematic view illustrating a state of the non-destructive inspection.

FIG. 2 is a schematic view illustrating a state of the non-destructive inspection.

The detector 130 includes multiple detection elements for inspecting the weld portion. For example, the detector 130 has a configuration that can be gripped by the hand of a human as illustrated in FIG. 2. The human that grips the detector 130 inspects the weld portion 13 by causing the tip of the detector 130 to contact the weld portion 13. Here, an example will be described in which a human grips the detector 130 and performs a weld inspection. Hereinafter, the human (e.g., the inspector) that grips the detector 130 and performs the weld inspection is called the user.

Figure 3:
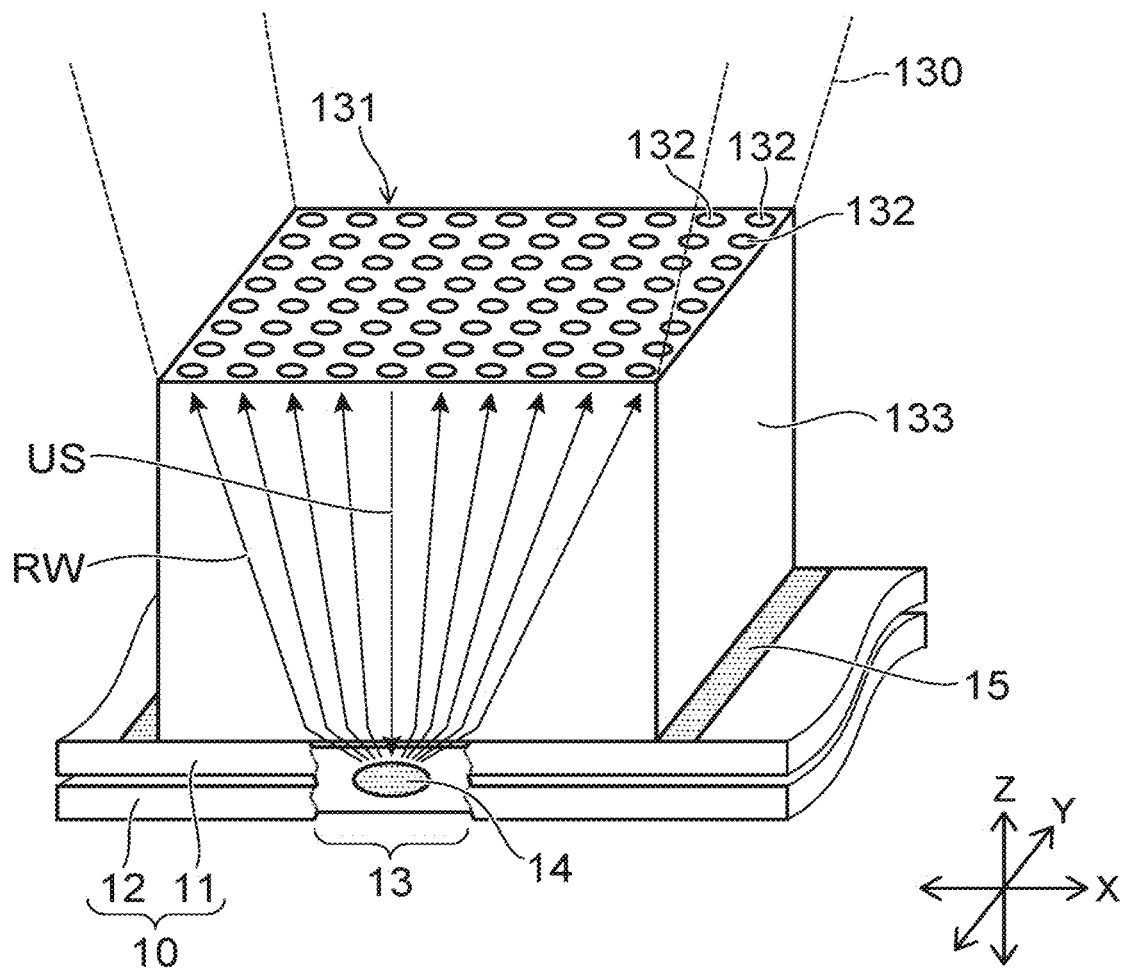
FIG. 3 is a schematic view illustrating the internal structure of the detector tip.

FIG. 3 is a schematic view illustrating the internal structure of the detector tip.

As illustrated in FIG. 3, an element array 131 that includes multiple detection elements 132 is provided inside the detector 130 tip. The detection elements 132 are, for example, transducers. For example, the element array 131 emits an ultrasonic wave of a frequency of not less than 1 MHz and not more than 100 MHz. The multiple detection elements 132 may be arranged in a line configuration in one direction or may be arranged in a matrix configuration in two directions crossing each other. In the example illustrated in FIG. 3, the multiple detection elements 132 are arranged in an X-direction (a first direction) and a Y-direction (a second direction) that are orthogonal to each other.

For example, the element array 131 is covered with a hard propagating member 133. The hard propagating member 133 is positioned between the element array 131 and the weld portion 13 when the tip of the detector 130 contacts the weld portion 13. The hard propagating member 133 includes a resin material or the like through which an ultrasonic wave propagates easily. By providing the hard propagating member 133 to correspond to the shape of the weld portion 13 surface, the ultrasonic wave easily propagates into the weld portion 13. Also, deformation, damage, etc., of the element array 131 can be suppressed by the hard propagating member 133 when the detector 130 contacts the weld portion 13. The hard propagating member 133 has a hardness sufficient to suppress the deformation, the damage, etc., when contacting the weld portion 13.

FIG. 2 and FIG. 3 illustrate a state of inspecting a member 10 as the welding object. The member 10 is made by spot-welding a metal plate 11 (a first member) and a metal plate 12 (a second member) at the weld portion 13. As illustrated in FIG. 3, a solidified portion 14 is formed at the weld portion 13 by a portion of the metal plate 11 and a portion of the metal plate 12 melting, mixing, and solidifying.

A couplant 15 is coated onto the surface of the object when inspecting so that the ultrasonic wave propagates easily between the object and the detector 130. Each of the detection elements 132 transmits an ultrasonic wave US toward the member 10 coated with the couplant 15 and receives reflected waves RW from the member 10.

Or, instead of the couplant 15, a soft propagating member through which an ultrasonic wave propagates easily may be provided at the tip of the detector 130. The soft propagating member is softer than the hard propagating member 133. The soft propagating member deforms along the shape of the surface of the weld portion 13 when contacting the weld portion 13. The soft propagating member includes, for example, a gel resin.

For example, as illustrated in FIG. 3, one detection element 132 transmits the ultrasonic wave US toward the weld portion 13. A portion of the ultrasonic wave US is reflected by the upper surface or the lower surface of the member 10, etc. The multiple detection elements 132 each receive (detect) the reflected waves RW. The detection elements 132 sequentially transmit the ultrasonic wave US, and the reflected waves RW are received by the multiple detection elements 132.

The processing device 110 determines whether or not the detector 130 contacts the welding object based on the detection result of the obtained reflected waves. The processing device 110 may calculate the tilt with respect to the weld portion 13 and inspect the weld portion 13 based on the detection result of the obtained reflected waves. For example, the processing device 110 stores the determination result of the contact, the calculation result of the tilt, the inspection result of the weld portion 13, etc., in the memory device 120.

Here, the angle between the normal direction of the surface of the weld portion 13 and the direction of the detector 130 is called the tilt. For example, the direction of the detector 130 corresponds to a Z-direction perpendicular to the arrangement direction of the detection elements 132. The tilt is zero when the detector 130 contacts the surface of the weld portion 13 perpendicularly.

The processing device 110 is connected to the memory device 120, the detector 130, the input device 140, and the display device 150 via wired communication, wireless communication, or a network.

Figure 4:
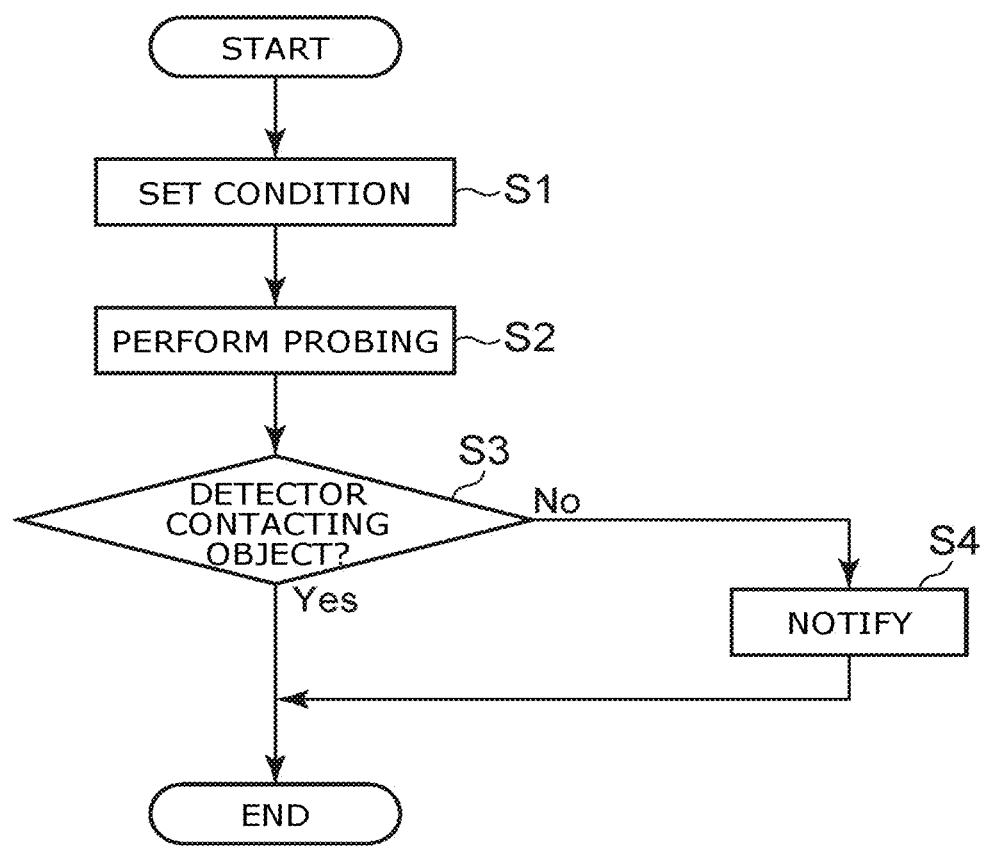
FIG. 4 is a flowchart illustrating the flow of a contact determination of the detector using the processing system according to the embodiment.

FIG. 4 is a flowchart illustrating the flow of a contact determination of the detector using the processing system according to the embodiment.

First, a condition for determining whether or not the detector 130 contacts the welding object is set (step S1). After the condition is set, the user moves the detector 130 so that the detector 130 contacts the weld portion 13. When the user determines that the tip of the detector 130 contacts the weld portion 13, the user uses the detector 130 to perform probing (step S2). For example, a button for performing probing is provided in the detector 130. The user can use the detector 130 to perform probing by operating the button. Or, the user may use the detector 130 to perform probing via the user interface displayed by the display device 150.

When the reflected wave is detected by the probing, the processing device 110 performs a first determination of determining whether or not the detector 130 contacts the welding object (step S3). The processing device 110 performs the first determination based on the detected reflected wave and the condition set in step S1.

When it is determined that the detector 130 does not contact the welding object as a result of the first determination, for example, the processing device 110 notifies the user (step S4). The method of the notification is arbitrary. The detector 130 may emit a sound or light toward the user. The display of the display device 150 may be changed. For example, an error message may be displayed in the display device 150. When it is determined that the detector 130 contacts the welding object, for example, the calculation of the tilt of the detector 130 or the inspection of the welding object is performed.

When the detector 130 does not contact the welding object, a detection result that reflects the state of the weld portion 13 is not obtained. If the calculation of the tilt or the inspection is performed using the detection result when the detector 130 is not in contact, there is a possibility that a mistaken result may be output. By performing the first determination, the calculation of the tilt or the inspection by using the detection result when the detector 130 is not in contact can be suppressed.

In other words, the determination of whether or not the detector 130 contacts the welding object is the determination of whether or not the detection result of an appropriate reflected wave is obtained. For example, the detector 130 may not directly contact the welding object and may contact via a couplant. In such a case, the ultrasonic wave propagates sufficiently between the detector 130 and the welding object via the couplant. Therefore, a detection result that is suited to the calculation of the tilt or the inspection is obtained. Even when the detector 130 directly contacts the welding object, there is a possibility that an appropriate detection result may not be obtained if the couplant is not filled sufficiently between the detector 130 and the welding object. Here, the determination based on the detection result of the reflected waves that the detection result is usable in the calculation of the tilt or the inspection is called the detector 130 being in contact with the welding object.

For example, even when the detector 130 appears to contact the welding object, there are cases where foreign matter such as a contaminant, residue when processing, or the like actually exists between the detector 130 and the welding object. Also, when there is a recess or a protrusion in the surface of the welding object, there are cases where a gap occurs between the detector 130 and the welding object. According to the embodiment, in such a case, the user is notified when the ultrasonic wave does not propagate sufficiently between the detector 130 and the welding object even via the couplant. Thereby, the user can know whether or not the detector 130 appropriately contacts the welding object even in cases where it is difficult to determine the contact of the detector 130 by the naked eye.

The setting of the condition in step S1 and the first determination of step S3 will now be described in detail.

In step S1, probing is performed in a state in which the detector 130 contacts the member and a state in which the detector 130 is separated from the member. The processing device 110 sets a first threshold by using the detection result of the reflected waves (a first detection result) when the detector 130 contacts the member and the detection result of the reflected waves (a second detection result) when the detector 130 is separated from the member.

Figure 5:
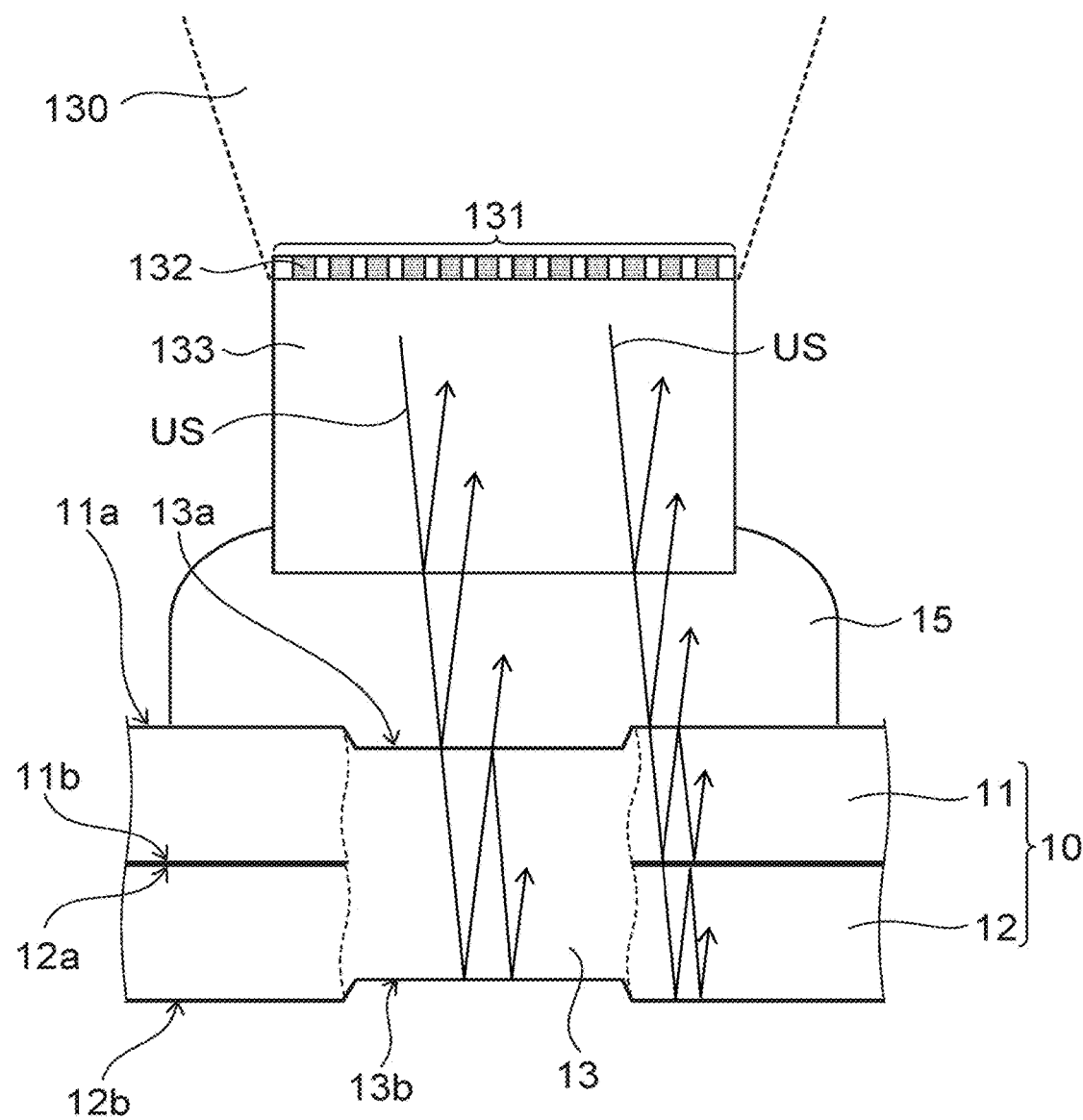
FIG. 5 is a schematic view illustrating the state of probing using the detector.

FIG. 5 is a schematic view illustrating the state of probing using the detector.

When the ultrasonic wave US is transmitted from the detector 130, a portion of the ultrasonic wave US is reflected by an upper surface 11a of the metal plate 11 or an upper surface 13a of the weld portion 13 as illustrated in FIG. 5. Another portion of the ultrasonic wave US enters the member 10 and is reflected by a lower surface 11b of the metal plate 11, a lower surface 13b of the weld portion 13, etc. The detector 130 detects the intensity of the reflected waves from the surfaces.

The intensity of the reflected wave may be represented in any form. For example, the reflected wave intensity that is output from the detection element 132 may include positive values and negative values according to the phase. Various processing may be performed based on the reflected wave intensity including the positive values and the negative values. The reflected wave intensity that includes the positive values and the negative values may be converted into absolute values. The average value of the reflected wave intensities may be subtracted from the reflected wave intensity at each time. Or, the weighted average value, the weighted moving average value, or the like of the reflected wave intensities may be subtracted from the reflected wave intensity at each time. The various processing described herein can be performed even when the results of such processing applied to the reflected wave intensity are used.

Figure 6:
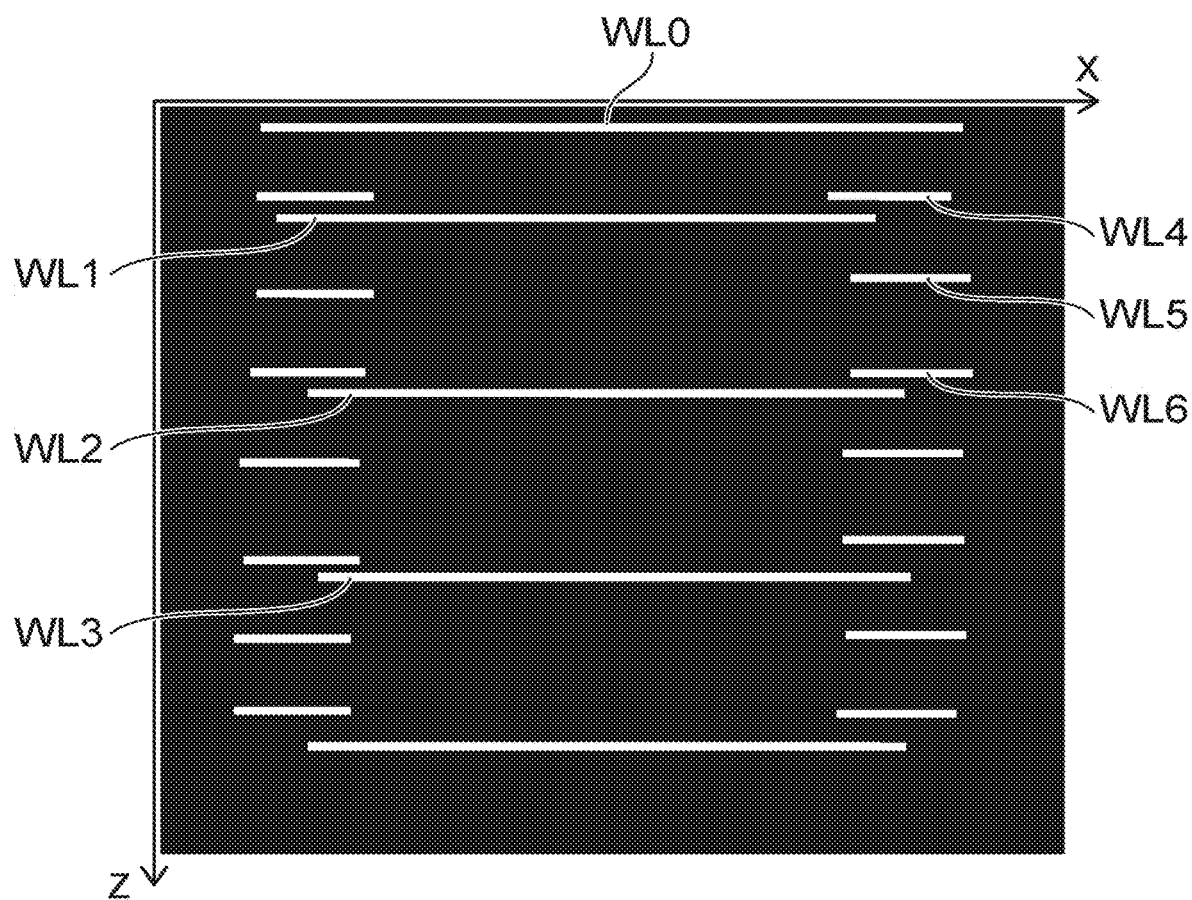
FIG. 6 is a schematic view of an image of the detection result of the reflected waves.

FIG. 6 is a schematic view of an image of the detection result of the reflected waves.

FIG. 6 illustrates the detection result when the detector 130 contacts the member 10 which is the welding object as illustrated in FIG. 5. FIG. 6 illustrates the state of the welding object in the X-Z cross section.

In FIG. 6, the points where the intensity of the reflected wave is high are illustrated using white. Here, the binarized intensity of the reflected wave is illustrated schematically. The position in the Z-direction corresponds to the time from emitting the ultrasonic wave until the reflected wave is received. The white lines that extend along the X-direction or the Y-direction illustrate the surfaces of the member.

In FIG. 6, multiple white lines that exist at the center in the X-direction or the Y-direction are based on the reflected waves from the upper surface 13a and the lower surface 13b of the weld portion 13. The multiple white lines that exist at the end side in the X-direction or the Y-direction are based on the reflected waves from the upper surface 11a of the metal plate 11, the lower surface 11b of the metal plate 11, and a lower surface 12b of the metal plate 12. Three or more white lines exist in the Z-direction in FIG. 6. This shows that the ultrasonic wave US undergoes multiple reflections between the upper surface and the lower surface of each portion of the member 10 as illustrated in FIG. 5.

For example, a white line WL1 is based on the reflected wave from the upper surface 13a of the weld portion 13. A white line WL2 is based on the reflected wave from the lower surface 13b of the weld portion 13. A white line WL3 is based on a multiple-reflection wave reflected between the upper surface 13a and the lower surface 13b. Similarly, a white line WL4 is based on the reflected wave from the upper surface 11a of the metal plate 11. A white line WL5 is based on the reflected wave from the lower surface 11b of the metal plate 11. A white line WL6 is based on a multiple-reflection wave reflected between the upper surface 11a and the lower surface 11b and the reflected wave from the lower surface 12b of the metal plate 12. A white line WL0 is based on the reflected wave from the surface of the hard propagating member 133.

In the member 10 illustrated in FIG. 5, the lower surface 11b of the metal plate 11 contacts an upper surface 12a of the metal plate 12, and a space does not exist between these surfaces. The thickness of the metal plate 11 is the same as the thickness of the metal plate 12. Therefore, the reflected wave from the upper surface 12a of the metal plate 12 is not included in the detection result illustrated in FIG. 6. The spacing is substantially the same between the white lines based on the reflected waves from the upper surface 11a, the lower surface 11b, and the lower surface 12b.

When setting the condition, the processing device 110 averages or sums the intensities of at least a portion of the detected reflected waves.

Specifically, the processing device 110 calculates a first reference value by averaging the intensities of at least a portion of the reflected waves included in the first detection result. The processing device 110 calculates a second reference value by averaging the intensities of at least a portion of the reflected waves included in the second detection result. Or, the processing device 110 may calculate the first reference value by summing the intensities of at least a portion of the reflected waves included in the first detection result. The processing device 110 may calculate the second reference value by summing the intensities of at least a portion of the reflected waves included in the second detection result.

When averaging or summing the intensities, the processing device 110 may convert the intensities of the reflected waves into absolute values. Or, the processing device 110 may apply prescribed processing to the intensities so that the intensities have the same sign. The processing device 110 sets a value between the first reference value and the second reference value as the first threshold.

The reflected waves are weaker when the detector 130 is separated from the object than when the detector 130 contacts the object. For example, the second reference value is less than the first reference value when the positive value of the intensity increases as the reflected wave becomes stronger. For example, the processing device 110 sets an intermediate value of the first reference value and the second reference value as the first threshold. The processing device 110 may set the first threshold by adding or subtracting, to the first reference value or the second reference value, a value corresponding to the difference between the first reference value and the second reference value.

When the condition (the first threshold) is set in step S1, the processing device 110 stores the condition in the memory device 120. In step S3, the processing device 110 performs the first determination by using the condition. Specifically, the processing device 110 calculates the first determination value by using the intensities of at least a portion of the reflected waves detected by the probing of step S2. When calculating the first determination value, the same calculation as when calculating the first reference value and the second reference value is used. Namely, when the first reference value and the second reference value are calculated by averaging the intensities, the first determination value similarly is calculated by averaging the intensities. When the first reference value and the second reference value are calculated by summing the intensities, the first determination value is calculated by summing the intensities.

The processing device 110 compares the first determination value and the first threshold. For example, when the positive value of the intensity increases as the reflected wave becomes stronger, the processing device 110 determines whether or not the first determination value is greater than the first threshold. When the first determination value is greater than the first threshold, the processing device 110 determines that the detector 130 contacts the welding object. When the first determination value is not more than the first threshold, the processing device 110 determines that the detector 130 is separated from the welding object.

In the calculation of the first determination value, the intensities of all of the detected reflected waves may be used, or the intensities of a portion of the detected reflected waves may be used. To reduce the calculation amount and shorten the time necessary for the determination, it is favorable to calculate the first determination value by using only the intensities of a portion of the reflected waves. When calculating the first determination value by using only the intensities of a portion of the reflected waves, the first reference value and the second reference value similarly are calculated using the intensities of a portion of the reflected waves included respectively in the first detection result and the second detection result.

Figure 7:
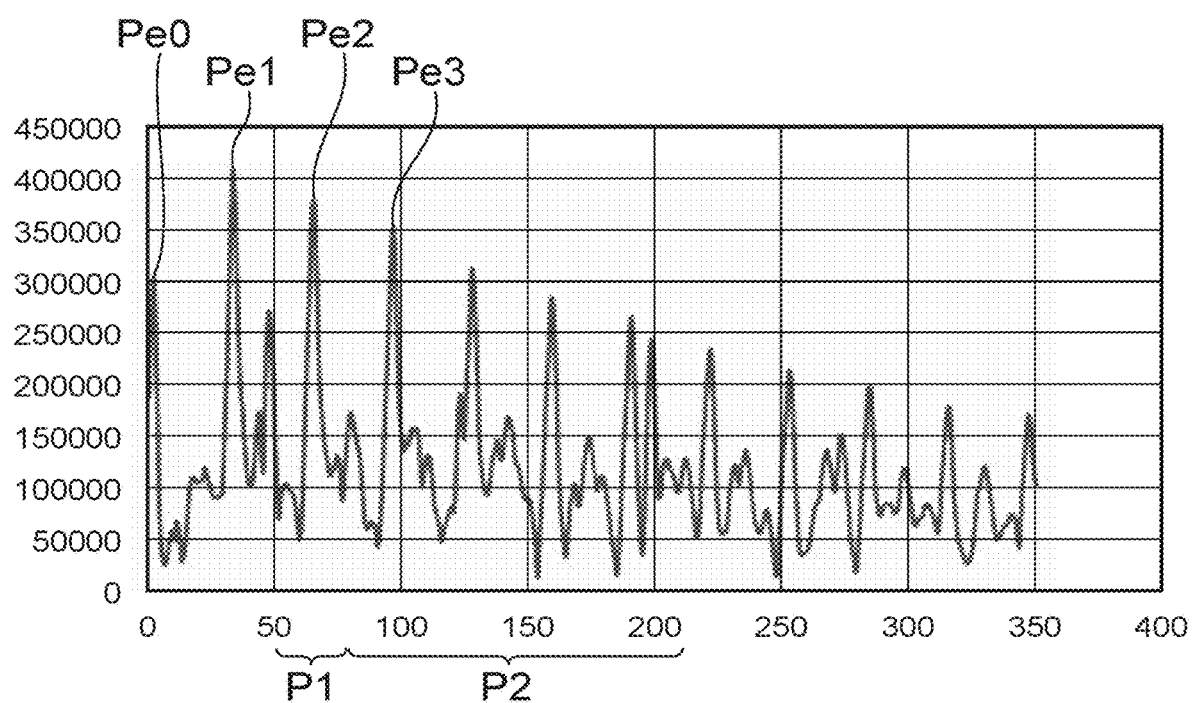
FIG. 7 is a graph illustrating the intensity distribution of the reflected waves.

FIG. 7 is a graph illustrating the intensity distribution of the reflected waves.

In FIG. 7, the horizontal axis is the position in the Z-direction, and the vertical axis is the intensity of the reflected wave. FIG. 7 illustrates the intensity distribution of the reflected waves in the Z-direction in one X-Z cross section. FIG. 7 illustrates the results in which the reflected wave intensities are converted into absolute values.

Multiple peaks appear in the intensity distribution illustrated in FIG. 7. A peak Pe0 is based on the reflected wave from the interface between the hard propagating member 133 and the couplant 15. A peak Pe1 is based on the reflected wave from the upper surface 13*a* of the weld portion 13. A peak Pe2 is based on the reflected wave from the lower surface 13*b* of the weld portion 13. A peak Pe3 and the subsequent periodic multiple peaks are based on multiple-reflection waves between the upper surface 13*a* and the lower surface 13*b*. The white lines WL0 to WL3 illustrated in FIG. 6 correspond respectively to the peaks Pe0 to Pe3. The multiple peaks having smaller intensities than the peaks Pe0 to Pe3 are based on the reflected waves and the multiple-reflection waves from the upper surfaces and the lower surfaces of the metal plates 11 and 12 other than the weld portion 13.

The peak Pe0 is based on the reflected wave from the interface between the hard propagating member 133 and the couplant 15. Therefore, the peak Pe0 is detected regardless of whether or not the detector 130 contacts the object. Also, the position of the peak Pe0 is constant regardless of whether or not the detector 130 contacts the object. Other than the peak Pe0, the intensities change according to whether or not the detector 130 contacts the welding object. Accordingly, when averaging or summing the intensities of the reflected waves, it is favorable to use the intensities of the detected reflected waves after the peak Pe0.

In particular, in the inspection of the weld portion 13, the ultrasonic wave is reflected by the lower surface 13*b* of the weld portion 13 and undergoes multiple reflections between the upper surface 13*a* and the lower surface 13*b*. The intensities of the reflected waves change greatly according to whether or not the detector 130 contacts the welding object. As illustrated in FIG. 7, to calculate the first determination value, the processing device 110 uses at least one of the intensity in a portion P1 in which the reflected wave from the lower surface 13*b* of the weld portion 13 is detected or the intensity in a portion P2 in which the multiple-reflection wave between the upper surface 13*a* and the lower surface 13*b* is detected. Thereby, in the first determination, the contact of the detector 130 with the welding object can be determined with higher accuracy.

The ranges of the portion P1 and the portion P2 may be preset. Other than the peak Pe0, the intervals of the peaks are dependent on the thickness of the weld portion 13. When the thickness of the weld portion 13 is known, the ranges of the portion P1 and the portion P2 can be set based on the thickness. The portion P2 may be set to include the peak Pe3 and all subsequent peaks, or may be set to include only a portion of the peak Pe3 and the subsequent peaks as illustrated in FIG. 7.

For example, the processing device 110 extracts a first portion in which the multiple-reflection waves are detected from the first detection result, and averages or sums the intensities of the reflected waves in the first portion to calculate the first reference value. The processing device 110 extracts a second portion in which the multiple-reflection waves are detected from the second detection result, and averages or sums the intensities of the reflected waves in the second portion to calculate the second reference value.

FIG. 6 and FIG. 7 illustrate the detection result in one X-Z cross section. The first determination value may be calculated based on the intensity distribution in one X-Z cross section, or may be calculated based on the intensity distribution in one X-Z cross section and one Y-Z cross section. The processing device 110 may generate the intensity distribution by averaging or summing the intensities in at least a portion of the X-Y plane for each of multiple points in the Z-direction and may calculate the first determination value based on the intensity distribution.

For example, when the diameter of the weld portion 13 is known, the processing device 110 may set the range used to calculate the first determination value in the X-Y plane based on the diameter of the weld portion 13. The diameter of the weld portion 13 is the length of the weld portion 13 in a direction perpendicular to the direction in which the metal plates 11 and 12 are overlaid. The calculation amount can be reduced by using only the intensities of a portion of the X-Y plane.

The user may be able to designate the range of the detection result used to calculate the first determination value, the first reference value, and the second reference value via the user interface displayed by the display device 150.

Figure 8:
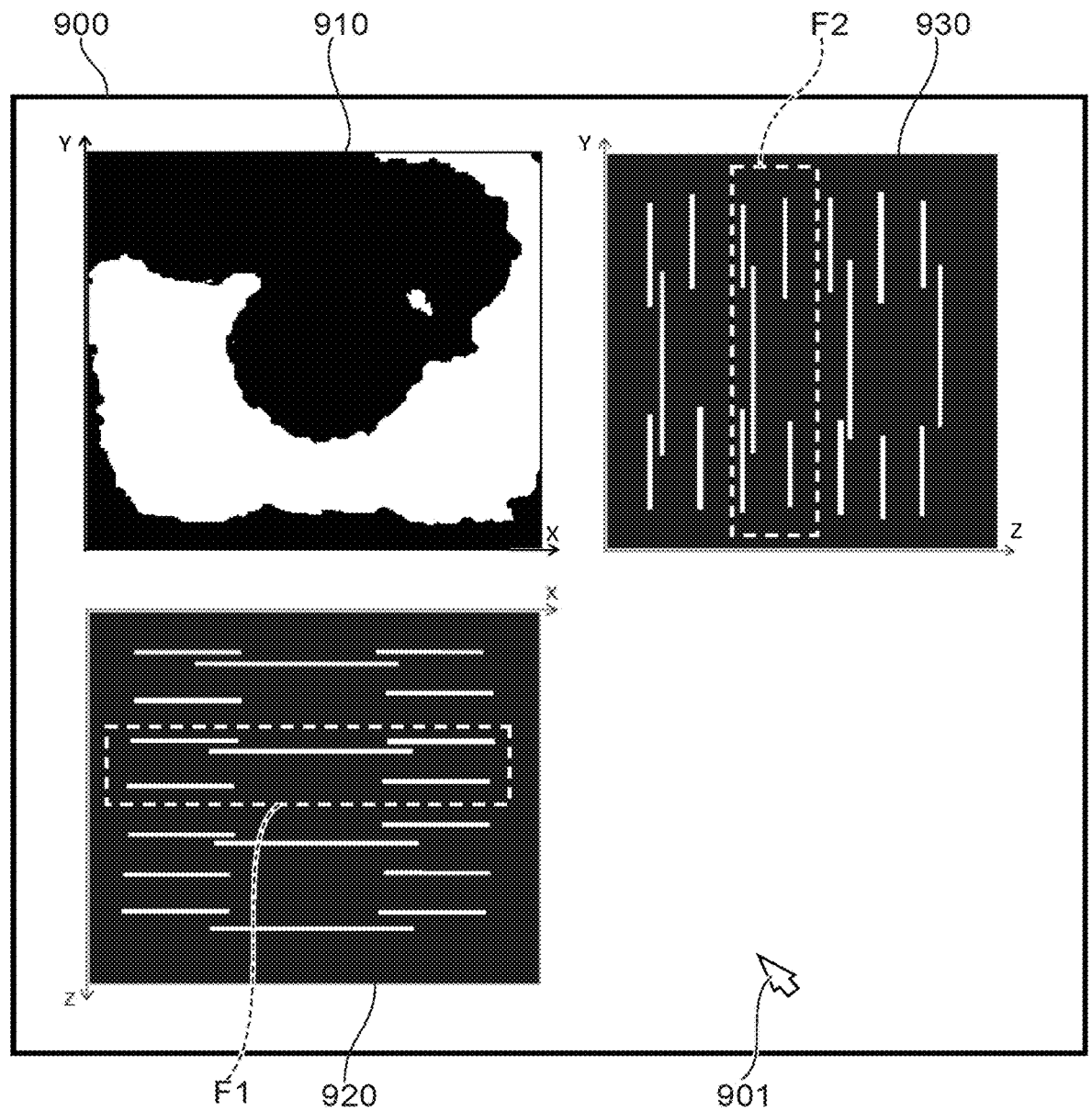
FIG. 8 is an example of the user interface displayed by the display device.

FIG. 8 is an example of the user interface displayed by the display device.

For example, the processing device 110 causes the display device 150 to display the user interface 900 illustrated in FIG. 8. For example, a first image 910, a second image 920, and a third image 930 are displayed in the user interface 900. The first to third images 910 to 930 illustrate the intensity of the reflected wave for each of multiple points. The points where the intensity of the reflected wave is high are illustrated using white. Here, the binarized intensity of the reflected wave is illustrated schematically.

The first image 910 illustrates the result of summing the intensities of the reflected waves in the Z-direction for each of the multiple points of the X-Y plane. The second image 920 illustrates the intensity of the reflected wave in the X-Z cross section at the Y-direction center of the first image 910. The third image 930 illustrates the intensity of the reflected wave in the Y-Z cross section at the X-direction center of the first image 910.

For example, the user can draw a frame F1 or F2 in the second image 920 or the third image 930 by operating a pointer 901 by using the input device 140. For example, when one of the frame F1 or F2 is set, the other of the frame F1 or F2 is set automatically at the same position in the Z-direction as the one of the frame F1 or F2. The size of the frame F1, the position in the X-direction of the frame F1, the size of the frame F2, and the position in the Y-direction of the frame F2 can be set freely by the user. Or, the X-direction center of the frame F1 may be fixed to the X-direction center of the second image 920, and the Y-direction center of the frame F2 may be fixed to the Y-direction center of the third image 930. For example, when the user changes the size of one of the frame F1 or F2, the size of the other of the frame F1 or F2 may change conjunctively.

For example, the user can adjust the size of the frames F1 and F2 by operating the pointer 901 to drag and drop the frames F1 and F2. When the sizes of the frames F1 and F2 are changed, the processing device 110 stores the positions of the changed frames F1 and F2. The processing device 110 calculates the first reference value based on the intensities of the reflected waves included in the frames F1 and F2 in the first detection result. The processing device 110 calculates the second reference value based on the intensities of the reflected waves included in the frames F1 and F2 in the second detection result. The processing device 110 calculates the first determination value based on the intensities of the reflected waves included in the frames F1 and F2 in the detection result obtained by the probing in step S2.

The processing device 110 may set a first range based on the first reference value and the second reference value. The processing device 110 may set the first threshold in addition to the first range. The lower limit and the upper limit of the first range are set to be between the first reference value and the second reference value. When the positive value of the intensity increases as the reflected wave becomes stronger, the lower limit and the upper limit of the first range are greater than the second reference value and less than the first reference value. For example, the processing device 110 calculates a first intermediate value of the first reference value and the second reference value. The processing device 110 sets an intermediate value between the first intermediate value and the first reference value as the upper limit of the first range. The processing device 110 sets an intermediate value between the first intermediate value and the second reference value as the lower limit of the first range.

For example, the processing device 110 sets an intermediate value between the first intermediate value and the first reference value as the first threshold. The first threshold may be set outside the first range. The processing device 110 stores the first threshold and the first range that are set in the memory device 120.

In the case where the first threshold and the first range are set, the processing device 110 determines whether or not the first determination value is within the first range when the first determination value is not more than the first threshold. The processing device 110 determines that the detector 130 is separated from the object when the first determination value is outside the first range (less than the lower limit of the first range). The processing device 110 determines that the state of the detector 130 cannot be designated when the first determination value is not less than the lower limit and not more than the upper limit of the first range.

The processing device 110 notifies the user in step S4 when determining in step S3 that the detector 130 is separated from the object or the state of the detector 130 cannot be designated.

Figure 9A:
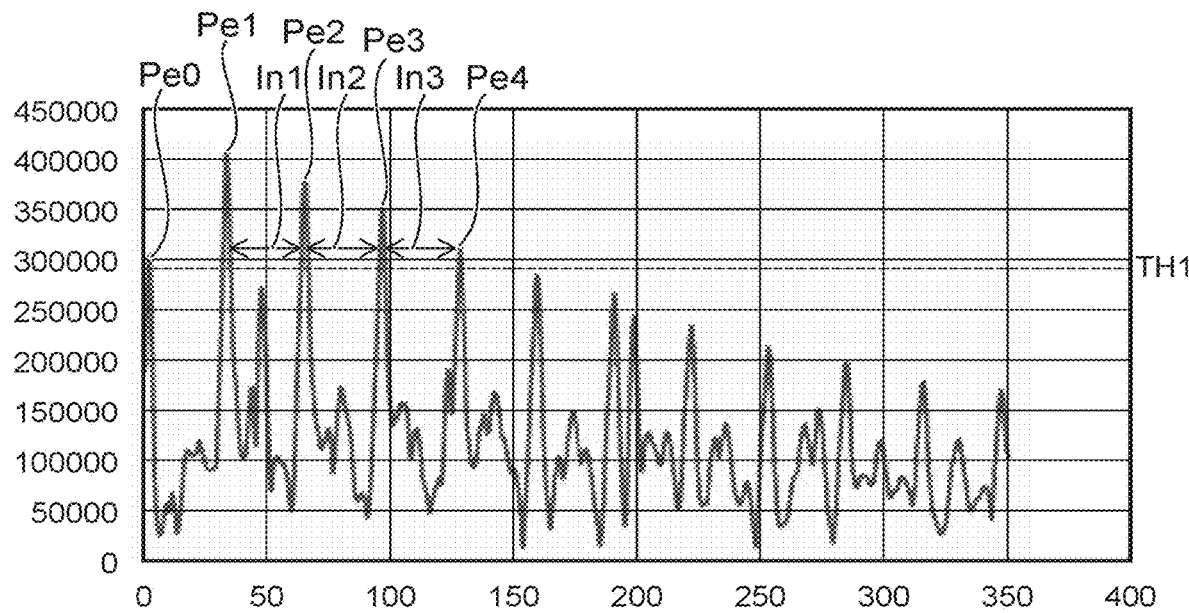
FIGS. 9A and 9B are graphs illustrating the intensity distribution of the reflected waves.
Figure 9B:
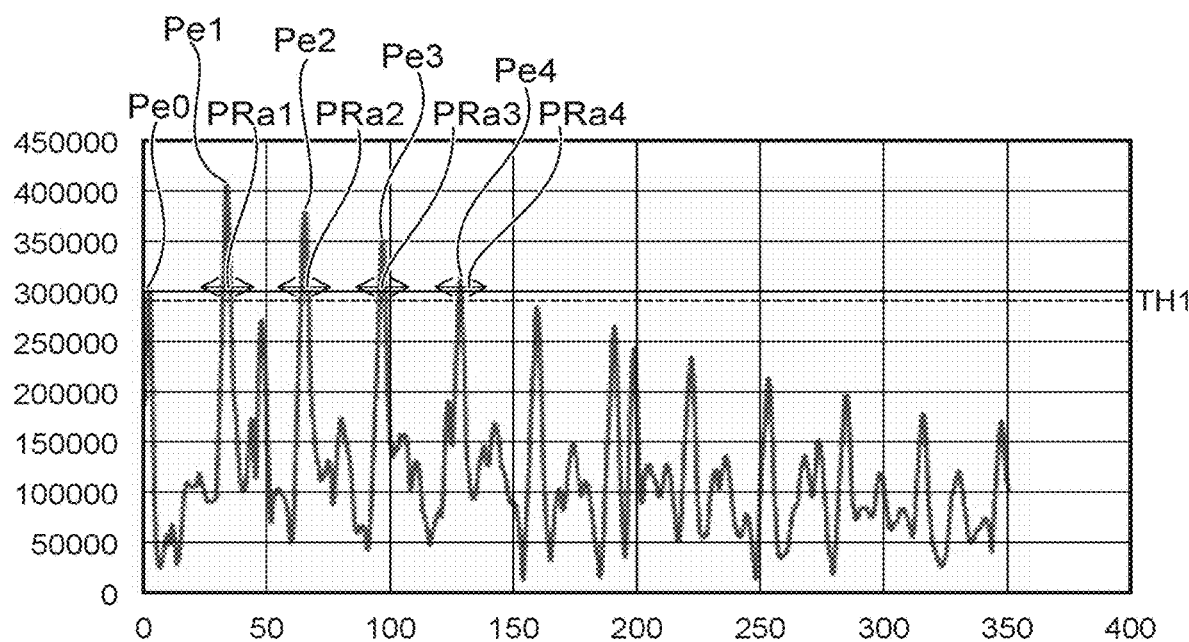

FIGS. 9A and 9B are graphs illustrating the intensity distribution of the reflected waves.

Similarly to FIG. 7, FIG. 9A and FIG. 9B illustrate the intensity of the reflected wave for each of multiple points in the Z-direction in one X-Z cross section. The processing device 110 may set the condition relating to the intervals or the positions of the peaks in step S1.

The member 10 that has the same structure as the object that is actually inspected is used in step S1. The detector 130 is caused to contact the weld portion 13, and probing is performed. The processing device 110 generates the intensity distribution of the reflected waves in the Z-direction from the detection result obtained when the detector 130 contacts the weld portion 13. The processing device 110 detects the peaks existing in the intensity distribution. For example, the processing device 110 extracts the peaks Pe0 to Pe4 that exceed a preset threshold TH1 from the detected peaks as illustrated in FIG. 9A. The processing device 110 removes the first peak Pe0 in the Z-direction, and only the peaks Pe1 to Pe4 caused by the reflected waves from the member 10 remain. The threshold TH1 may be preset by the user or may be set based on an average value of at least a portion of the intensity distribution, etc.

For example, as illustrated in FIG. 9A, the processing device 110 calculates the average of intervals In1 to In3 between the peaks Pe1 to Pe4. The processing device 110 uses the average value as a reference to set the condition relating to the intervals of the peaks. Or, the processing device 110 may set the condition relating to the positions of the peaks by using the positions of the peaks Pe1 to Pe4 as a reference. For example, as illustrated in FIG. 9B, the processing device 110 sets ranges PRa1 to PRa4 of the peaks based on the peaks Pe1 to Pe4. For example, the positions of the centers of the ranges PRa1 to PRa4 correspond respectively to the positions of the maximum intensities of the peaks Pe1 to Pe4. The size of the range of the peaks may be preset by the user or may be set based on the full widths at half maximum of the detected peaks, etc. The processing device 110 stores the condition relating to the intervals or the positions of the peaks in the memory device 120.

In the first determination, the processing device 110 extracts the peaks having intensities not less than the threshold TH1 from the intensity distribution of the detected reflected wave.

The processing device 110 determines whether or not the intervals of the extracted peaks satisfy the condition relating to the intervals of the peaks set in step S1. For example, the processing device 110 determines that the condition is satisfied when the intervals of the extracted peaks are not less than (1−x) times and not more than (1+x) times an average value AVG of the intervals of the peaks calculated in step S1. x is preset by the user. Or, x may be set based on the standard deviation of the intervals of the peaks, etc.

Or, the processing device 110 determines whether or not the positions of the extracted peaks satisfy the condition relating to the positions of the peaks set in step S1. For example, the processing device 110 determines whether or not the positions of the extracted peaks each are within the ranges PRa1 to PRa4 set in step S1. In the first determination, the processing device 110 determines that the condition is satisfied when the peaks are positioned in the ranges PRa1 to PRa4.

The processing device 110 may perform the first determination by using both the condition relating to the intervals of the peaks and the condition relating to the positions of the peaks.

Or, the processing device 110 may determine the contact of the detector 130 based on the spectrum of the reflected wave intensity. In step S1, the member 10 that has the same structure as the object that is actually inspected is used. The detector 130 is caused to contact the weld portion 13, and probing is performed. The processing device 110 generates the intensity distribution of the reflected waves in the Z-direction from the detection result obtained when the detector 130 contacts the weld portion 13. The processing device 110 performs spectral analysis of the intensity distribution and generates the spectrum of the relationship between the reflected wave intensity and the reciprocal of the thickness (mm) of the member. A Fourier transform is used in the spectral analysis.

Figure 10:
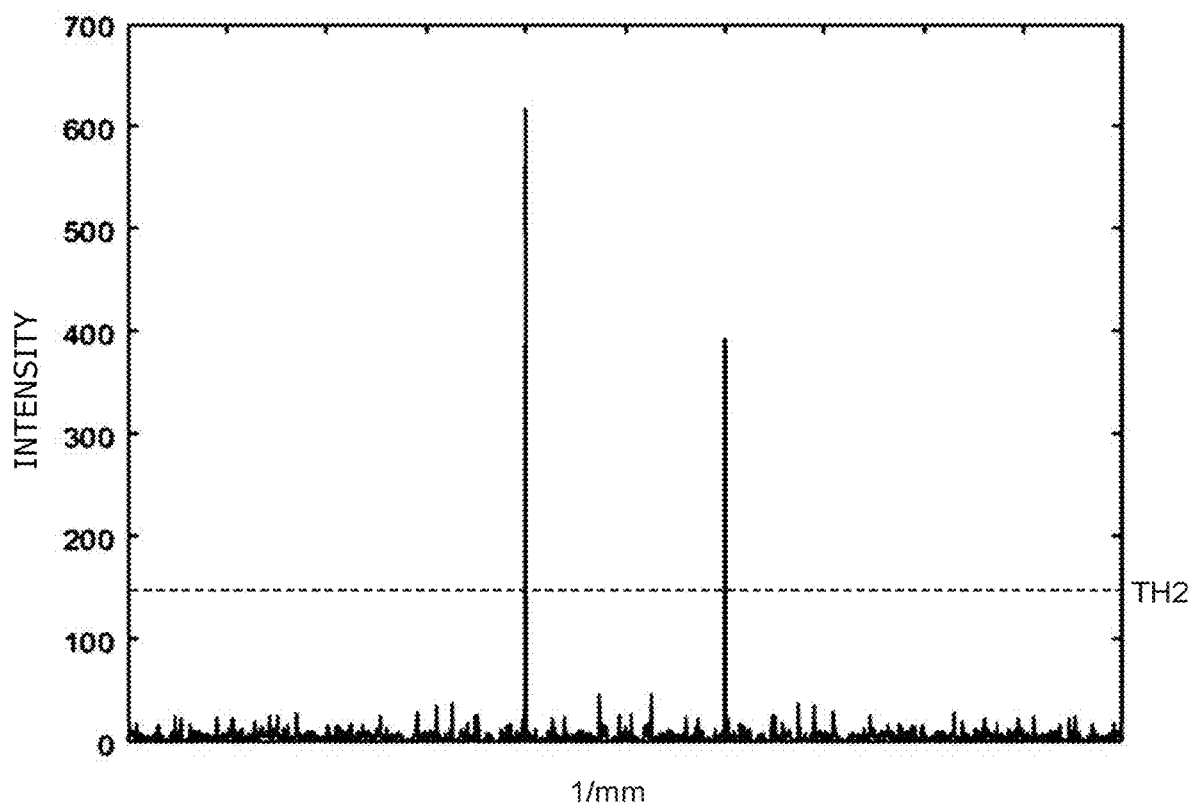
FIG. 10 is a graph illustrating the spectrum.

FIG. 10 is a graph illustrating the spectrum.

In FIG. 10, the horizontal axis is the reciprocal of the thickness (mm) of the member, and the vertical axis is the intensity of the reflected waves corresponding to the components of the horizontal axis. As illustrated in FIG. 5, the ultrasonic wave undergoes multiple reflections at the metal plate 11, the metal plate 12, or the weld portion 13. Therefore, the intensity of the reflected wave has a periodicity corresponding to the thickness of the metal plate 11, the thickness of the metal plate 12, and the thickness of the weld portion 13. For example, when the thickness of the metal plate 11 and the thickness of the metal plate 12 are the same, an intense peak appears at the reciprocal of the thickness of the metal plates 11 and 12 and the reciprocal of the thickness of the weld portion 13 as illustrated in FIG. 10.

When the spectrum is generated in step S1, the processing device 110 extracts peaks having intensities that are not less than a threshold TH2 as illustrated in FIG. 10. The processing device 110 sets the condition by using a value V1 of the reciprocal of the thickness where each peak appears as a reference. Subsequently, when the spectrum is generated in the first determination, the processing device 110 extracts the peaks that have intensities not less than the threshold TH2. The processing device 110 determines whether or not a value V2 of the reciprocal of the thickness where each peak appears satisfies the condition. For example, the processing device 110 determines that the condition is satisfied when the value V2 of the reciprocal of the thickness where the peak appears is not less than (1−y) times and not more than (1+y) times the value V1. y is preset by the user. Or, y may be set based on the standard deviation of the intervals, etc.

The intervals of the peaks, the positions of the peaks, or the positions of the peaks in the spectrum are unique values of the welding object. The contact of the detector 130 can be determined with higher accuracy by using these values for the condition of the first determination.

In the processing system 100, the calculation of the tilt of the detector 130 or the inspection of the weld portion 13 may be performed when it is determined that the detector 130 contacts the welding object. Also, the processing system 100 may set the range of the detection result used to calculate the tilt.

Figure 11:
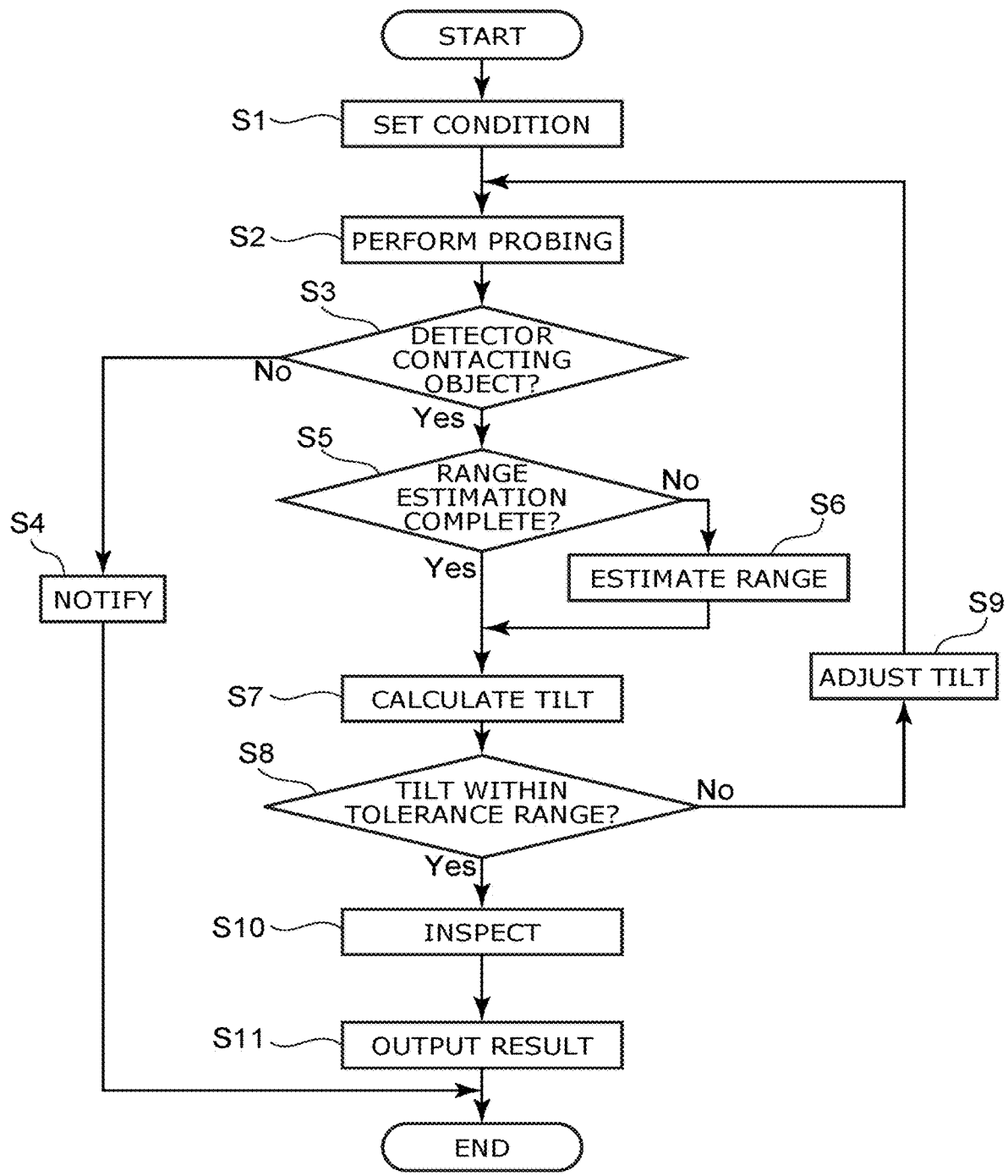
FIG. 11 is a flowchart illustrating the flow of the inspection using the processing system according to the embodiment.

FIG. 11 is a flowchart illustrating the flow of the inspection using the processing system according to the embodiment.

Steps S1 to S4 are performed similarly to the flowchart illustrated in FIG. 4. When it is determined that the detector 130 contacts the welding object in step S3, the processing device 110 determines whether or not the estimation of the range corresponding to the reflected waves from the weld portion 13 in the detection result is complete (step S5). When the range is not yet estimated, the processing device 110 estimates the range (step S6).

For example, as illustrated in FIG. 5, FIG. 6, and FIG. 8, the ultrasonic wave is reflected also from surfaces other than the weld portion 13. The processing device 110 estimates the range corresponding to the reflected waves from the weld portion 13 and subsequently calculates the tilt based on the reflected waves included in this range. The necessary calculation amount can be reduced thereby. Also, the accuracy of the calculated tilt can be increased.

The processing device 110 calculates the tilt of the detector 130 based on the detection result of the reflected waves within the estimated range (step S7). It is determined whether or not the calculated tilt is within a tolerance range (step S8). The determination may be performed by the user or may be performed by the processing device 110. When the processing device 110 performs the determination, the tolerance range may be preset by the user or may be set based on the history of previous inspection results.

For example, when performing the inspection of the weld portion 13, the processing device 110 also measures the diameter of the weld portion 13 based on the detection result. The diameter of the weld portion 13 corresponds to the lengths in the X-direction and the Y-direction of the portion in which the reflected waves from the upper surface and the lower surface of the weld portion 13 are detected. For example, if the tilt of the detector 130 is too large, the diameter of the weld portion 13 that is calculated is less than the actual value. The calculated diameter of the weld portion 13 increases as the tilt of the detector 130 decreases. When the tilt of the detector 130 is sufficiently small, the calculated diameter of the weld portion 13 substantially no longer changes. Such relationships between the tilt of the detector 130 and the diameter of the weld portion 13 calculated previously are stored in the memory device 120. Based on the data stored in the memory device 120, the processing device 110 determines a boundary value so that the change of the diameter of the weld portion 13 with respect to the change of the tilt of the detector 130 becomes small. The processing device 110 sets the size of the tolerance range based on the boundary value. For example, the processing device 110 sets the boundary value as the size of the tolerance range. Or, to increase the accuracy of the inspection, the processing device 110 may set, as the tolerance range, a value that is less than the value calculated based on the boundary value.

The probing by the detector 130 may be re-performed when performing steps S6 and S7. Favorably, the detection result that is used in the first determination of step S3 is used when performing steps S6 and S7. Thereby, the number of times of performing the probing can be reduced, and the calculation amount of the processing device 110 and the detector 130 can be reduced.

When the tilt is not within the tolerance range, the user adjusts the tilt of the detector 130 (step S9). When the processing device 110 performs step S8, the user may be notified that the tilt is not within the tolerance range. After step S9, step S2 is re-performed using the tilt after the adjustment. As a result, it is redetermined whether or not the detector 130 contacts the welding object after adjusting the tilt as well. Thereby, the recalculation of the tilt can be suppressed by using the detection result when the detector 130 is not in contact after the adjustment of the tilt.

Or, after adjusting the tilt and performing the probing of step S2, step S3 may be omitted. In step S3 before adjusting the tilt, it has been determined that the detector 130 contacts the welding object. Accordingly, after adjusting the tilt, likelihood of the detector 130 being separated from the welding object is low. By omitting step S3, the calculation amount of the processing device 110 can be reduced.

The inspection is performed when the tilt is within the tolerance range (step S10). When the user compares the tilt and the tolerance range, the user causes the processing device 110 to perform the inspection when the tilt is within the tolerance range. When the processing device 110 compares the tilt and the tolerance range, the processing device 110 automatically performs the inspection when the tilt is within the tolerance range. The processing device 110 outputs the result of the inspection to the display device 150 (step S11). The inspection result includes the information indicating whether or not the weld is joined, the diameter of the weld portion, the minimum diameter of the weld portion, the maximum diameter of the weld portion, etc.

An example of the specific processing of the estimation of the range, the calculation of the tilt, and the inspection will now be described.

Estimation of Range

Step S6 will now be described in detail with reference to FIG. 12A to FIG. 19.

For example, in FIG. 6, the detection result of the reflected waves is illustrated two-dimensionally. The detection result of the reflected waves may be illustrated three-dimensionally. For example, the member 10 is illustrated by multiple voxels. Coordinates in the X-direction, the Y-direction, and the Z-direction are set for each of the voxels. A reflected wave intensity is associated with each of the voxels based on the detection result of the reflected waves. The processing device 110 estimates a range (a group of voxels) corresponding to the weld portion 13 for the multiple voxels.

The number of voxels and the size of each voxel that are set may be determined automatically or may be set by the user via the user interface 900.

Figure 12A:
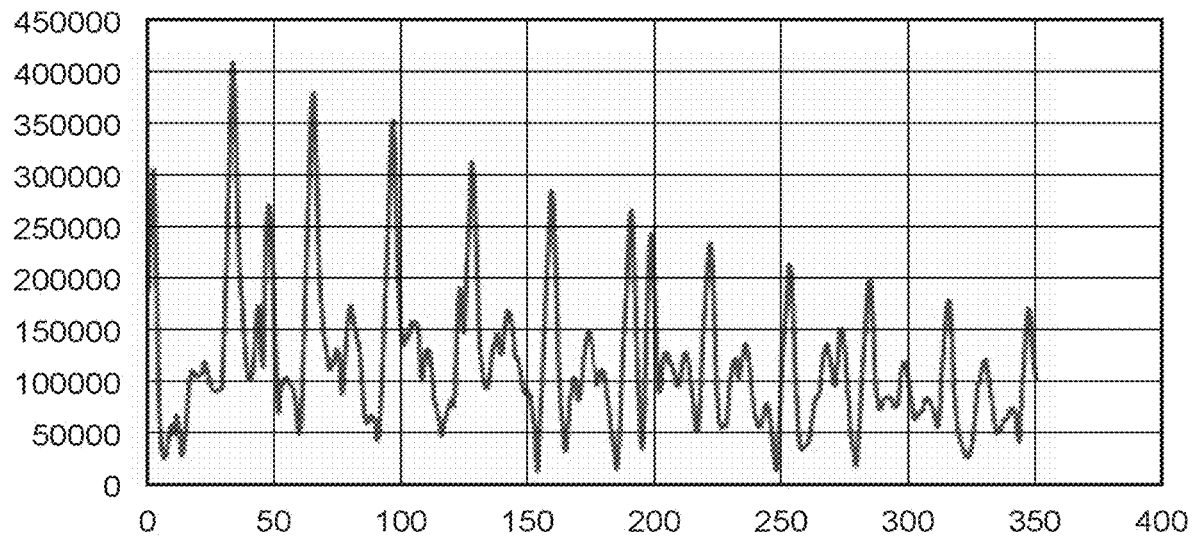
FIG. 12A and FIG. 12B are graphs illustrating the intensity distribution of the reflected waves in the Z-direction for one cross section.
Figure 12B:
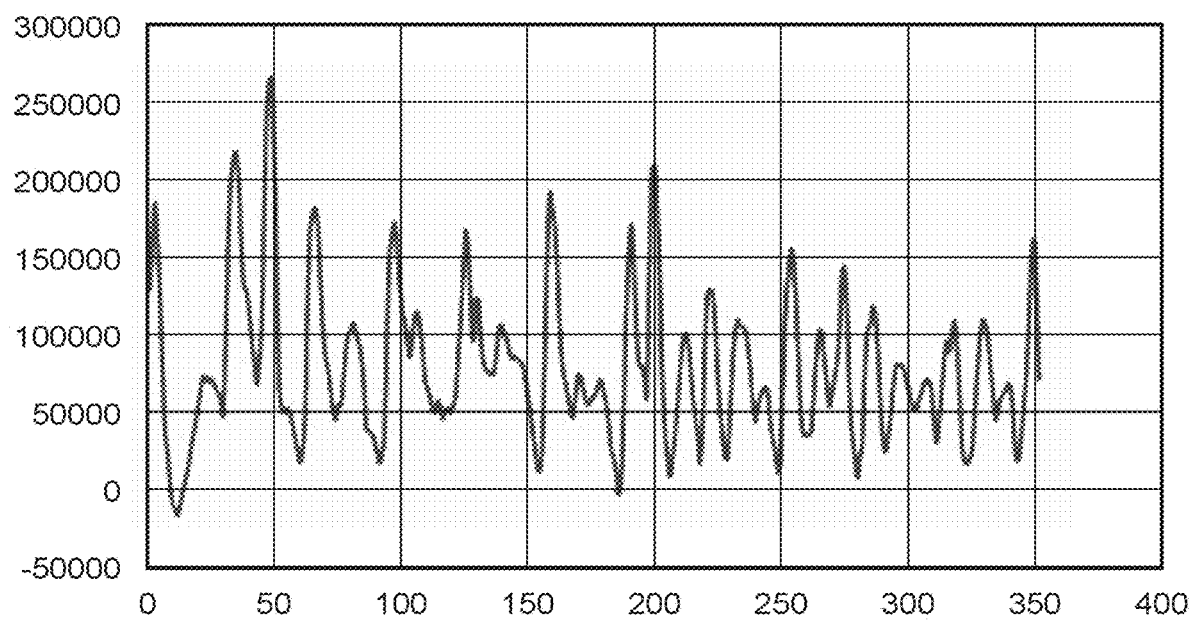

FIG. 12A and FIG. 12B are graphs illustrating the intensity distribution of the reflected waves in the Z-direction for one cross section.

Figure 13:
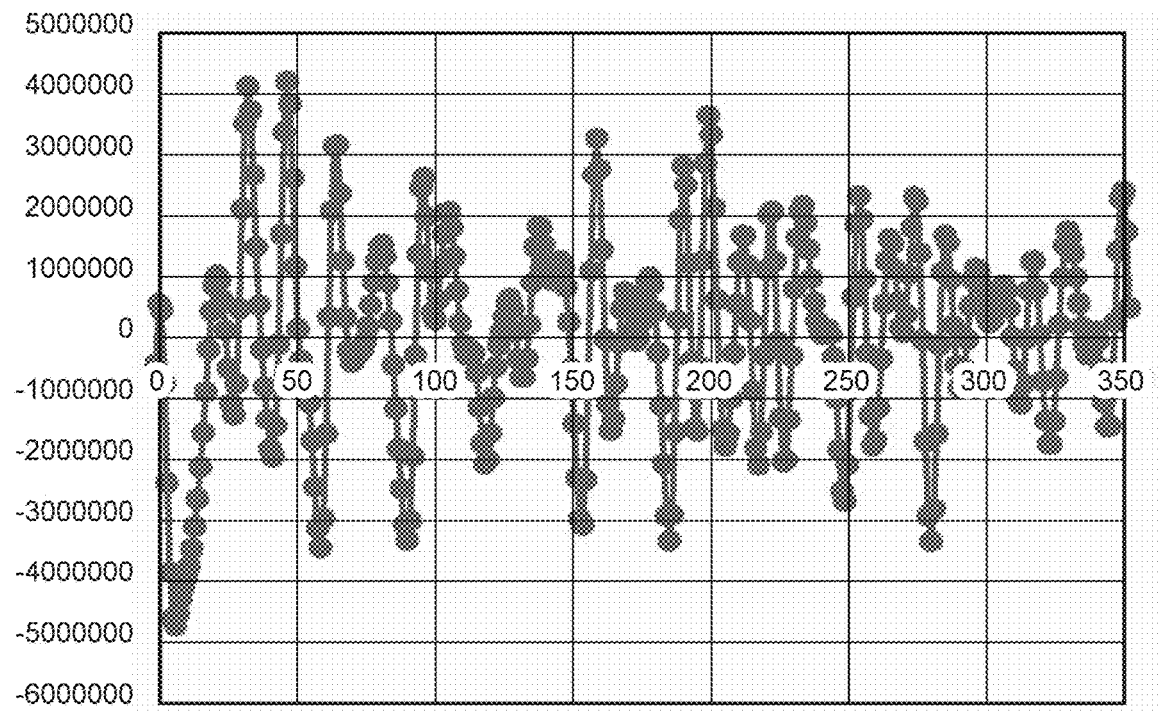
FIG. 13 is a graph illustrating the intensity distribution of the reflected waves in the Z-direction.

FIG. 13 is a graph illustrating the intensity distribution of the reflected waves in the Z-direction.

The processing device 110 generates the intensity distribution of the reflected waves in the Z-direction based on the detection result of the reflected waves. FIG. 12A and FIG. 12B are such examples. When the intensity distribution already has been generated, the intensity distribution may be used when determining the contact of the detector 130. In FIG. 12A and FIG. 12B, the horizontal axis is the position in the Z-direction, and the vertical axis is the intensity of the reflected wave. FIG. 12A illustrates the intensity distribution of the reflected waves in the Z-direction in one X-Z cross section. FIG. 12B illustrates the intensity distribution of the reflected waves in the Z-direction in one Y-Z cross section. FIG. 12A and FIG. 12B illustrate the results in which the reflected wave intensities are converted into absolute values.

Or, the processing device 110 may generate the intensity distribution of the reflected waves in the Z-direction by summing the reflected wave intensities in the X-Y plane for each of multiple points in the Z-direction. FIG. 13 is such an example. In FIG. 13, the horizontal axis is the position in the Z-direction and the vertical axis is the intensity of the reflected wave. FIG. 13 illustrates the results of converting the reflected wave intensities into absolute values and subtracting the average value of the reflected wave intensities from the reflected wave intensity for each of the multiple points in the Z-direction.

The intensity distribution of the reflected waves in the Z-direction includes components reflected by the upper surface 13a and the lower surface 13b of the weld portion 13 and components reflected by the upper surface and the lower surface of other portions. The processing device 110 extracts only the components reflected by the upper surface 13a and the lower surface 13b of the weld portion 13 from the intensity distribution of the reflected waves by filtering. For example, values that correspond to integer multiples of half of the thickness in the Z-direction (the distance between the upper surface 13a and the lower surface 13b) of the weld portion 13 are preset. The processing device 110 extracts only the periodic components of the values by referring to the values.

A band-pass filter, a zero-phase filter, a low-pass filter, a high-pass filter, threshold determination of the intensity after the filtering, etc., can be used as the filtering.

Figure 14:
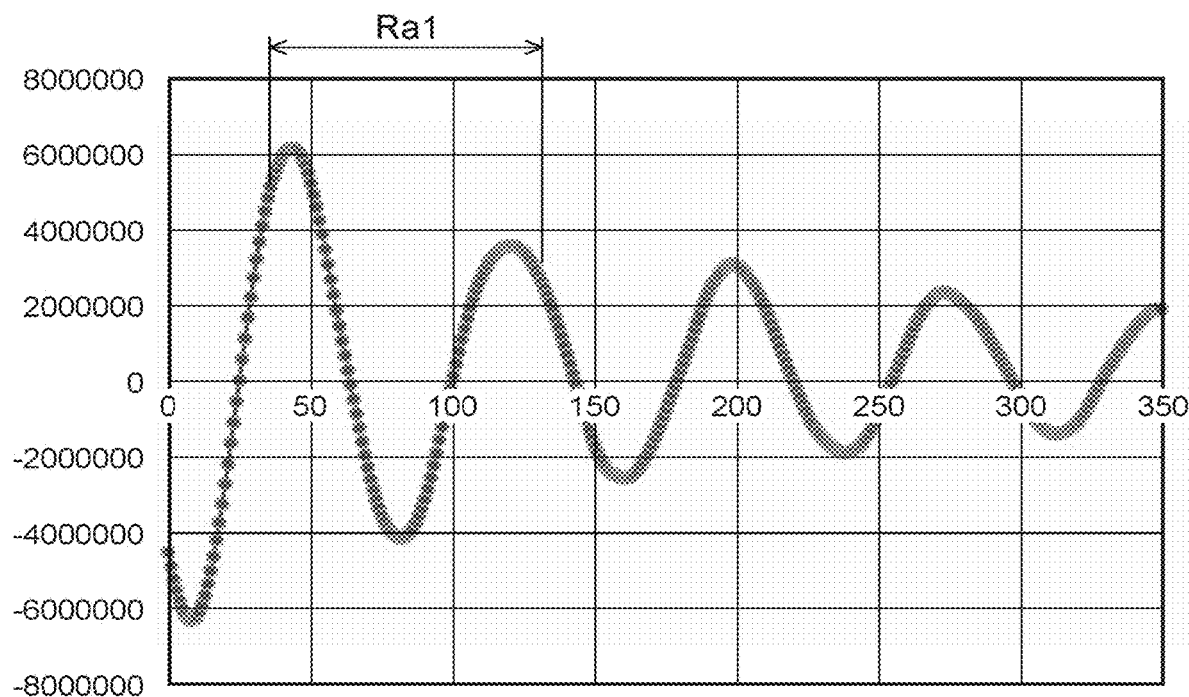
FIG. 14 is a graph illustrating the results of filtering the intensity distribution of the reflected waves.

FIG. 14 is a graph illustrating the results of filtering the intensity distribution of the reflected waves.

In FIG. 14, the horizontal axis is the position in the Z-direction, and the vertical axis is the intensity of the reflected waves. In the results of the filtering as illustrated in FIG. 14, only the components reflected by the upper surface and the lower surface of the weld portion are extracted.

The processing device 110 estimates the range of the weld portion in the Z-direction based on the extraction results. For example, the processing device 110 detects peaks included in the extraction results. The processing device 110 detects the position in the Z-direction of a first peak and the position in the Z-direction of a second peak. For example, the processing device 110 uses these positions as a reference to estimate a range Ra1 illustrated in FIG. 14 as the range of the weld portion in the Z-direction.

There are cases where the sign (positive or negative) of the reflected wave intensity from the upper surface of the weld portion and the sign of the reflected wave intensity from the lower surface of the weld portion are reversed due to the structure of the weld portion, the configuration of the element array 131, etc. In such a case, the processing device 110 may detect a peak of one of positive or negative and another peak of the other of positive or negative. The processing device 110 uses the positions of these peaks as references to estimate the range of the weld portion in the Z-direction. Also, according to the processing of the reflected wave intensity, there are cases where the reflected wave intensity has only positive values or negative values. In such a case, the range of the weld portion in the Z-direction may be estimated based on the positions of multiple peaks, may be estimated based on the positions of the peak and the bottom, or may be estimated based on the positions of multiple bottoms. In other words, the processing device 110 uses the reflected wave intensity after the filtering to estimate the range of the weld portion in the Z-direction based on the positions of multiple extrema.

When the intensity distribution of the reflected waves is generated for each of the X-Z cross section and the Y-Z cross section, the range in the Z-direction based on the intensity distribution in the X-Z cross section and the range in the Z-direction based on the intensity distribution in the Y-Z cross section are estimated. For example, the processing device 110 calculates the average, the weighted average, the weighted moving average, or the like of the multiple estimation results and estimates the calculation result to be the range of the entire weld portion in the Z-direction.

Or, the processing device 110 may estimate the range of the weld portion in the Z-direction based on the intensity distribution of the reflected waves for one of the X-Z cross section or the Y-Z cross section and use the estimation result as the range of the entire weld portion in the Z-direction. The processing device 110 may estimate the range of the weld portion in the Z-direction based on the intensity distribution of the reflected waves for a portion in the X-direction and a portion in the Y-direction and use the estimation result as the range of the entire weld portion in the Z-direction. The calculation amount necessary for the generation of the intensity distribution of the reflected waves can be reduced by such processing.

In the example of FIG. 14, the position in the Z-direction of the lower limit of the range Ra1 is set by subtracting a prescribed value from the position in the Z-direction of the first peak. The position in the Z-direction of the upper limit of the range Ra1 is set by adding a prescribed value to the position in the Z-direction of the second peak. Thereby, the second peak can be suppressed from being outside the range in the Z-direction of the weld portion at some point in the X-Y plane if the upper surface and the lower surface of the weld portion are tilted with respect to the arrangement direction of the detection elements 132.

After estimating the range of the weld portion in the Z-direction, the processing device 110 estimates the range of the weld portion in the X-direction and the range of the weld portion in the Y-direction.

Figure 15:
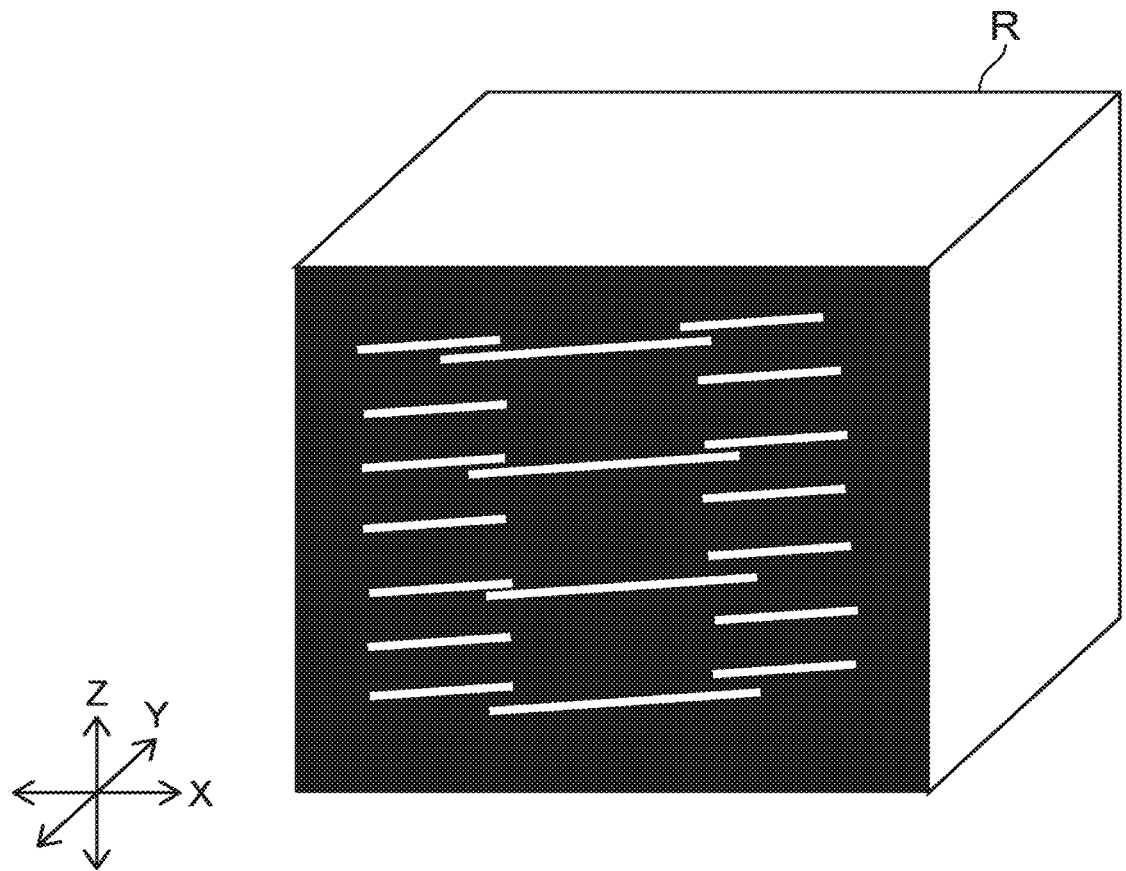
FIG. 15 is a schematic view illustrating the detection result of the reflected waves.
Figure 17:
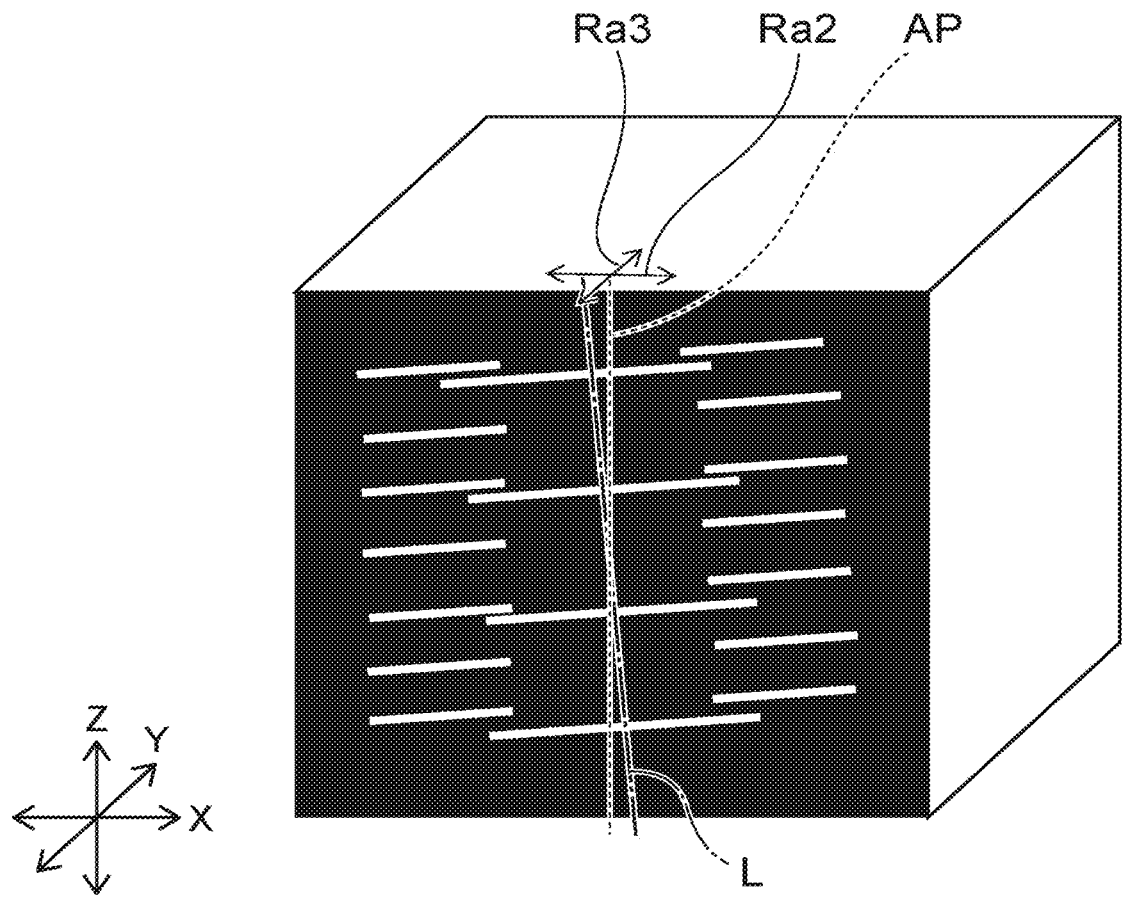
FIG. 17 is a schematic view illustrating the detection result of the reflected waves.

FIG. 15 and FIG. 17 are schematic views illustrating the detection result of the reflected waves.

In FIG. 15 and FIG. 17, a region R is the entire region where the detection result of the reflected waves is obtained by the element array 131. One cross section of the region R includes the components of the reflected waves of the upper surface and the lower surface of the weld portion and the components of the reflected waves of the upper surface and the lower surface of the other portions.

The processing device 110 generates the intensity distribution of the reflected waves in the X-Y plane for each of multiple points in the Z-direction. The processing device 110 may generate the intensity distribution within a preset range in the Z-direction. The calculation amount can be reduced thereby. Or, the processing device 110 may generate the intensity distribution within the estimated range in the Z-direction. Thereby, the reflected wave component being outside the lower surface of the weld portion when generating the intensity distribution of the reflected waves in the X-Y plane can be suppressed while reducing the calculation amount.

Figure 16A:
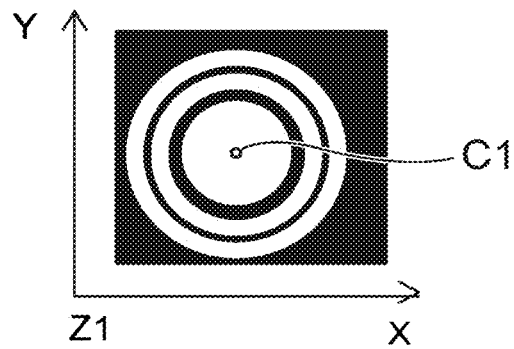
FIGS. 16A to 16C are examples of the intensity distribution of the reflected waves in the X-Y plane.
Figure 16B:
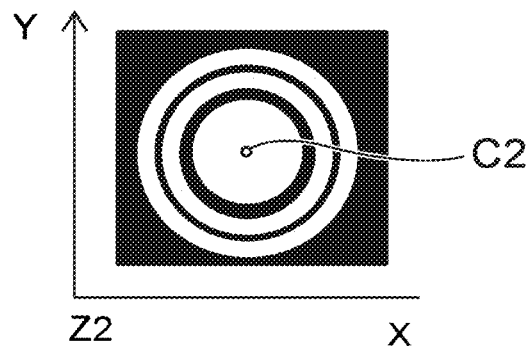
Figure 16C:
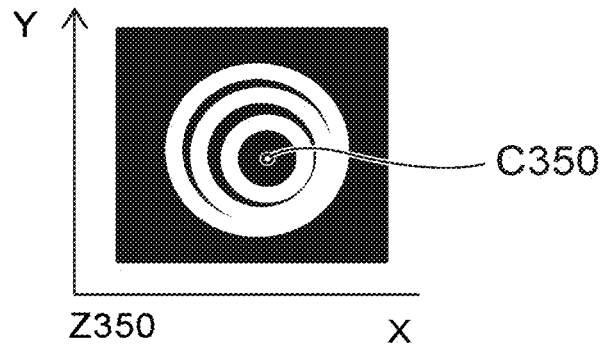

FIG. 16A to FIG. 16C are examples of the intensity distribution of the reflected waves in the X-Y plane. FIG. 16A illustrates the intensity distribution of the reflected waves in the X-Y plane at the coordinate of Z=1. FIG. 16B illustrates the intensity distribution of the reflected waves in the X-Y plane at the coordinate of Z=2. FIG. 16C illustrates the intensity distribution of the reflected waves in the X-Y plane at the coordinate of Z=350. The binarized intensity of the reflected wave is illustrated schematically in FIG. 15, FIG. 16A to FIG. 16C, and FIG. 17.

The processing device 110 calculates the centroid position of the intensity distribution of the reflected waves in the X-Y plane for each of the multiple points in the Z-direction. Here, the centroid position of the intensity distribution is obtained by calculating the centroid position of an image of the intensity distribution. For example, as illustrated in FIG. 16A to FIG. 16C, the processing device 110 calculates centroid positions C1 to C350 of the images. FIG. 17 illustrates the results of a line segment L connecting all of the centroid positions from Z=0 to Z=350.

The processing device 110 averages the centroid positions from Z=0 to Z=350. The average position of the centroids in the X-direction and the average position of the centroids in the Y-direction are obtained thereby. In FIG. 17, an average position AP illustrates the average position of the centroids in the X-direction and the average position of the centroids in the Y-direction. The processing device 110 uses prescribed ranges in the X-direction and the Y-direction from the average position AP at the center as a range Ra2 of the weld portion in the X-direction and a range Ra3 of the weld portion in the Y-direction.

For example, a value V that indicates the diameter of the detector 130 (the element array 131) is preset to estimate the range Ra2 and the range Ra3. The processing device 110 uses the ranges of AP−V/2 to AP+V/2 as the range Ra2 and the range Ra3 respectively in the X-direction and the Y-direction. In such a case, the estimated range in the X-Y plane is quadrilateral. The estimated range is not limited to the example; the estimated range in the X-Y plane may have a polygonal shape having five or more corners, a circular shape, etc. The shape of the estimated range in the X-Y plane is modifiable as appropriate according to the shape of the weld portion.

The range Ra2 and the range Ra3 may be determined using another value based on the value V. Instead of the value indicating the diameter of the detector 130, a value that indicates the diameter of the weld portion may be preset. This is because the diameter of the weld portion corresponds to the diameter of the detector 130. The value that indicates the diameter of the weld portion can be considered to be a value that substantially indicates the diameter of the detector 130.

The range Ra1 in the Z-direction, the range Ra2 in the X-direction, and the range Ra3 in the Y-direction of the weld portion are estimated by the processing described above. After the ranges are estimated, step S7 illustrated in FIG. 11 is performed based on the detection result of the reflected waves in the estimated ranges.

Figure 18:
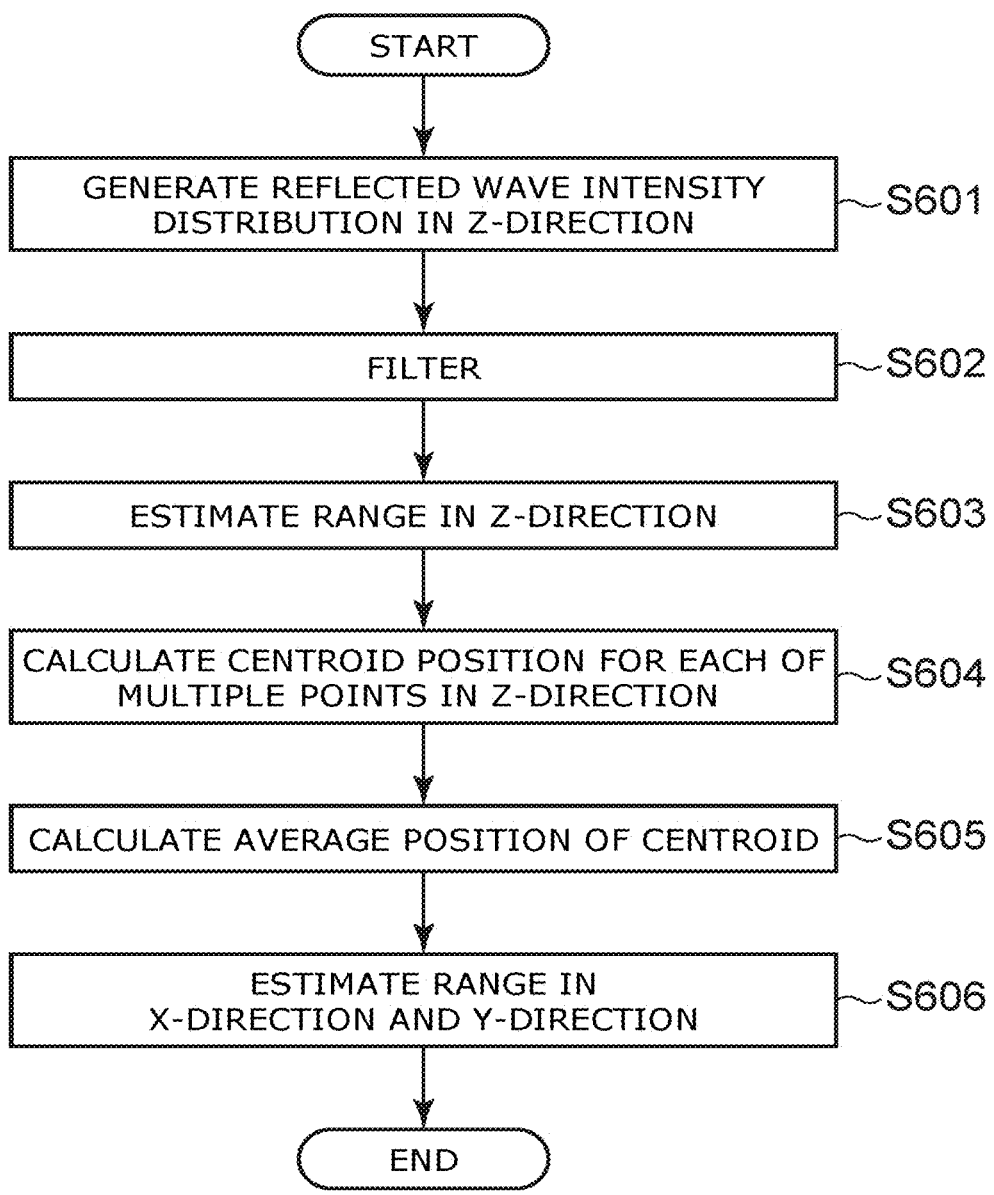
FIG. 18 is a flowchart illustrating the flow of the estimation of the range of the processing system according to the embodiment.

FIG. 18 is a flowchart illustrating the flow of the estimation of the range of the processing system according to the embodiment.

The processing device 110 generates the intensity distribution of the reflected waves in the Z-direction based on the detection result of the reflected waves by the detector 130 (step S601). The processing device 110 filters the intensity distribution based on a value of the thickness of the weld portion (step S602). Thereby, only the reflected wave components of the weld portion 13 are extracted from the intensity distribution. Based on the extraction results, the processing device 110 estimates the range of the weld portion in the Z-direction (step S603). The processing device 110 calculates the centroid position of the reflected wave intensity in the X-Y plane for each of multiple points in the Z-direction (step S604). The processing device 110 calculates the average position by averaging the multiple calculated centroid positions (step S605). Based on the average position and the diameter of the detector 130, the processing device 110 estimates the range in each of the X-direction and the Y-direction (step S606).

The estimate of the range in the Z-direction may be performed after estimating the ranges in the X-direction and the Y-direction. For example, steps S601 to S603 may be performed after steps S604 to S606 in the flowchart illustrated in FIG. 18. In such a case, the processing device 110 may calculate the intensity distribution of the reflected waves in the Z-direction within the estimated ranges in the X-direction and the Y-direction. The calculation amount can be reduced thereby.

Calculation of Tilt

Figure 19:
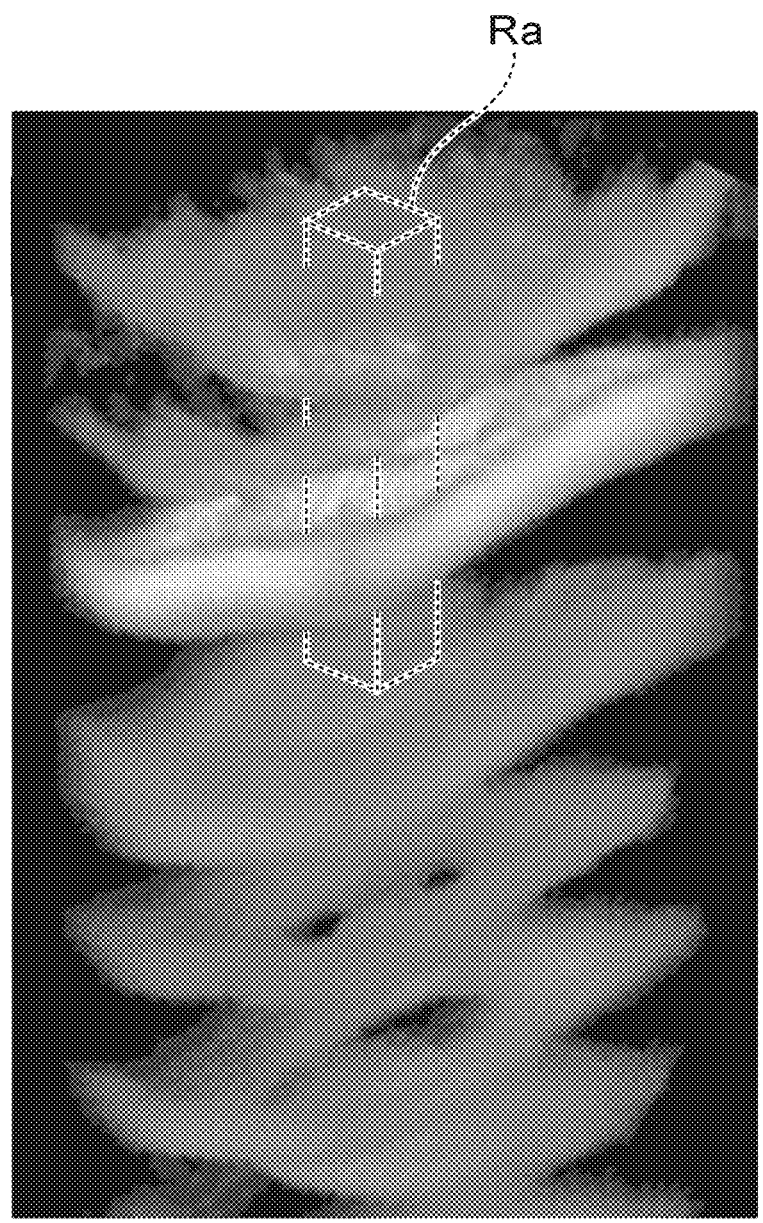
FIG. 19 is an image illustrating a detection result of the reflected waves.
Figure 19:
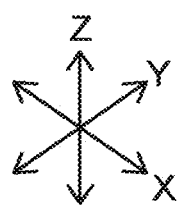

FIG. 19 is an image illustrating a detection result of the reflected waves.

In FIG. 19, whiter colors show that the intensity of the reflected wave is greater at that point. The processing device 110 performs the operation illustrated in FIG. 18 for the detection result illustrated in FIG. 19. As a result, a range Ra is estimated.

One specific example of a method for calculating the tilt in the range Ra will now be described.

Figure 20:
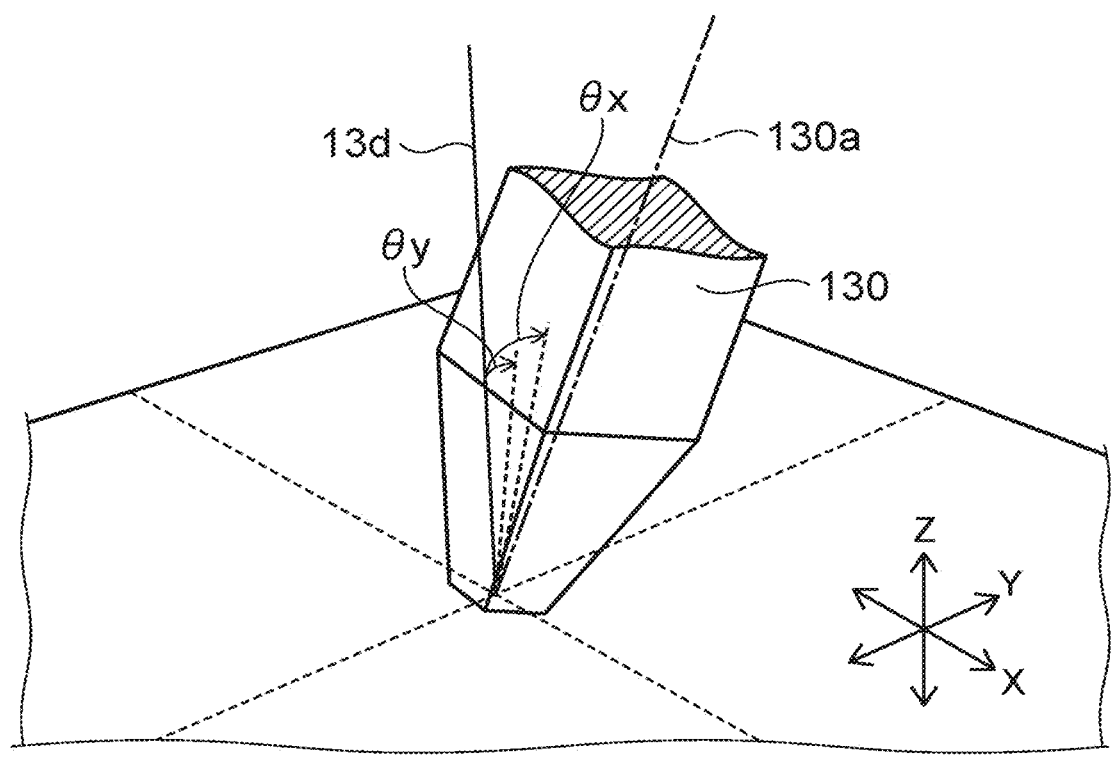
FIG. 20 is a drawing for describing the processing according to the processing system according to the embodiment.

FIG. 20 is a drawing for describing the processing according to the processing system according to the embodiment.

FIG. 21 and FIGS. 22A to 22C are examples of images obtained by the processing system according to the embodiment.

Figure 21:
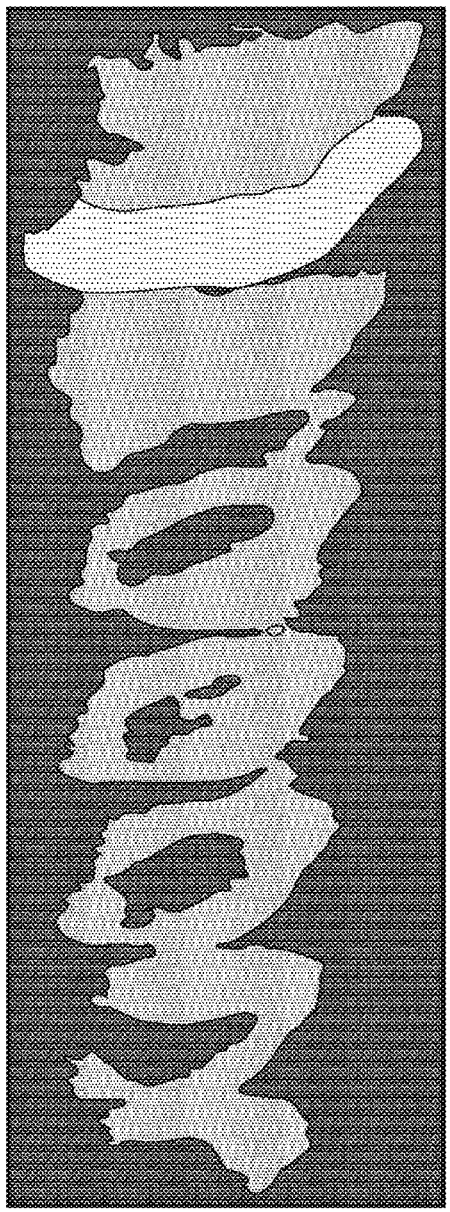
FIG. 21 is an example of images obtained by the processing system according to the embodiment.
Figure 21:
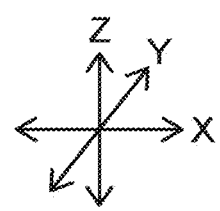
Figure 22A:
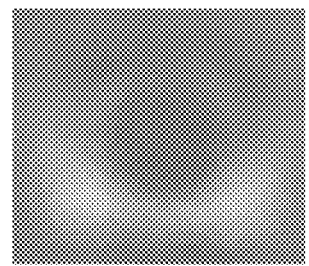
FIGS. 22A to 22C are examples of images obtained by the processing system according to the embodiment.
Figures 22B, 22C:
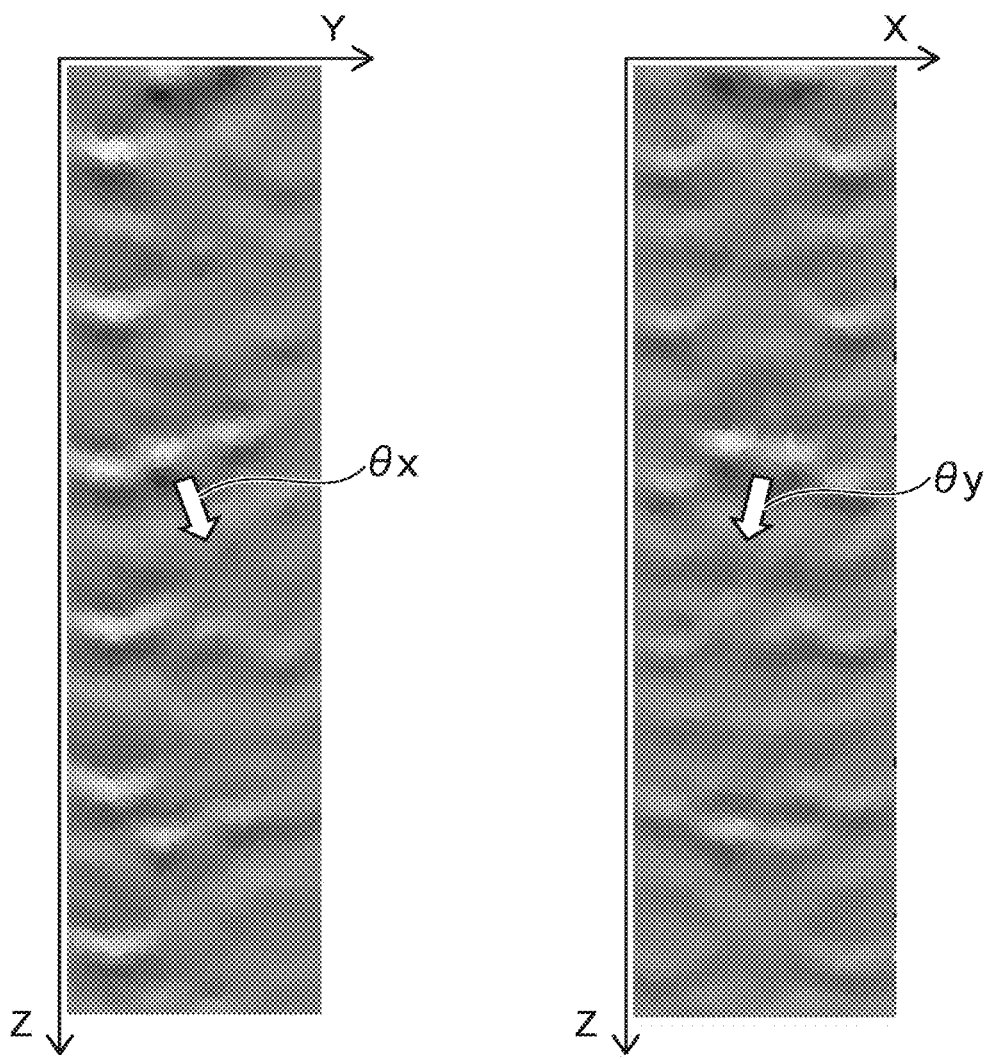

FIG. 21 is three-dimensional volume data depicted based on the detection result of the reflected waves. FIG. 22A illustrates the surface of the weld portion 13 in the volume data illustrated in FIG. 21. FIG. 22B illustrates the Y-Z cross section at the weld portion 13 vicinity in the volume data illustrated in FIG. 21. FIG. 22C illustrates the X-Z cross section at the weld portion 13 vicinity in the volume data illustrated in FIG. 21. In FIG. 22B and FIG. 22C, the upper side is the surface of the weld portion, and the data downward in the depth direction is shown. The portions where the luminance is high are portions where the reflection intensity of the ultrasonic wave is large. The ultrasonic wave is reflected strongly by the bottom surface of the weld portion 13, a surface between the members not joined to each other, etc.

The tilt of the detector 130 corresponds to the angle between a direction 13d perpendicular to the weld portion 13 and a direction 130a of the detector 130 illustrated in FIG. 20. This angle is expressed as an angle $\theta x$ around the X-direction and an angle $\theta y$ around the Y-direction. The direction 130a of the detector 130 is perpendicular to the arrangement direction of the detection elements 132.

The angle $\theta x$ is calculated based on the detection result in the Y-Z cross section as illustrated in FIG. 22B. The angle $\theta y$ is calculated based on the detection result in the X-Z cross section as illustrated in FIG. 22C. The processing device 110 calculates the average of the three-dimensional luminance gradients in the cross sections as the angles $\theta x$ and $\theta y$. The processing device 110 stores the calculated angles $\theta x$ and $\theta y$ in the memory device 120 as the tilt of the detector 130. The processing device 110 may cause the display device 150 to display the calculated tilt.

Inspection

Figure 23A:
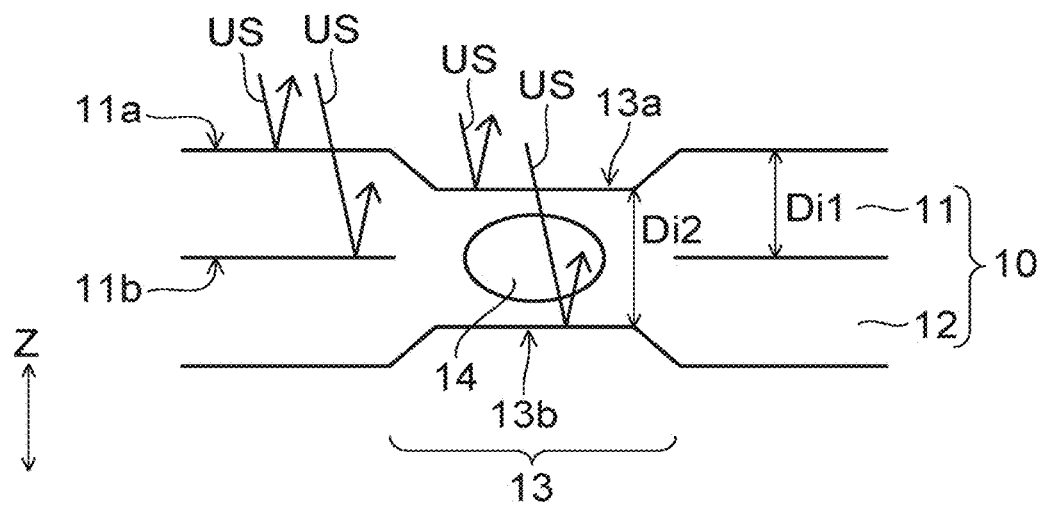
FIGS. 23A to 23C are schematic views for describing the inspection method according to the processing system according to the embodiment.

FIG. 23A is a schematic view for describing the inspection method according to the processing system according to the embodiment.

As illustrated in FIG. 23A, a portion of the ultrasonic wave US is reflected by the upper surface 11a of the metal plate 11 or the upper surface 13a of the weld portion 13. Another portion of the ultrasonic wave US enters the member 10 and is reflected by the lower surface 11b of the metal plate 11 or the lower surface 13b of the weld portion 13.

The positions in the Z-direction of the upper surface 11a, the upper surface 13a, the lower surface 11b, and the lower surface 13b are different from each other. In other words, the distance in the Z-direction between the detection element 132 and these surfaces are different from each other. The peaks of the intensities of the reflected waves are detected when the detection element 132 receives the reflected waves from these surfaces. Which surface reflected the ultrasonic wave US can be verified by calculating the time until each peak is detected after transmitting the ultrasonic wave US.

Figures 23B, 23C:
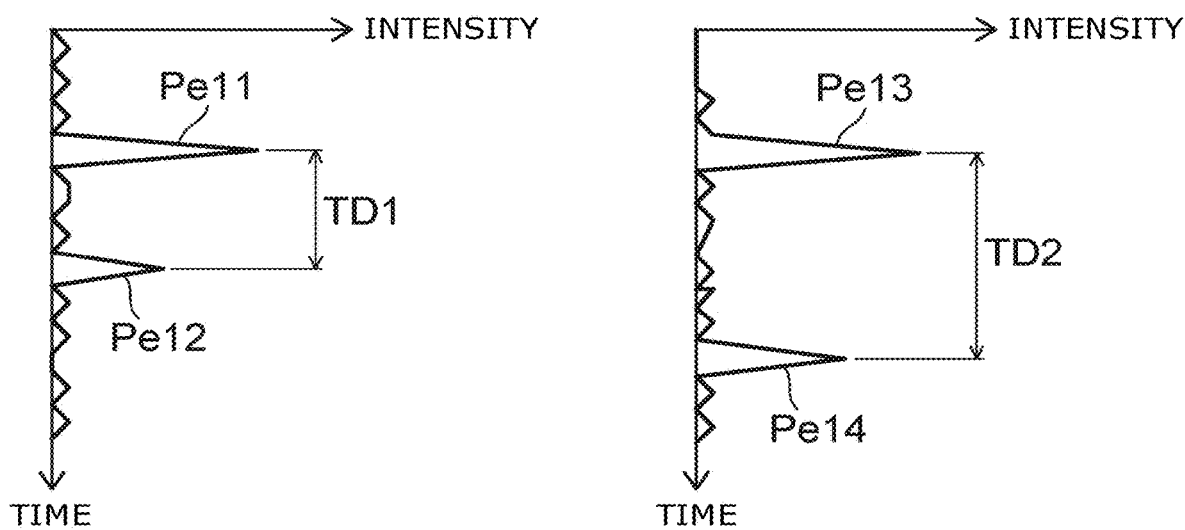

FIG. 23B and FIG. 23C are graphs illustrating the relationship between the time after transmitting the ultrasonic wave US and the intensity of the reflected wave RW. In FIG. 23B and FIG. 23C, the vertical axis is the elapsed time after transmitting the ultrasonic wave US. The horizontal axis is the intensity of the detected reflected wave RW. Here, the intensity of the reflected wave RW is illustrated as an absolute value. The graph of FIG. 23B illustrates the detection result of the reflected waves RW from the upper surface 11a and the lower surface lib of the metal plate 11. The graph of FIG. 23C illustrates the detection result of the reflected waves RW from the upper surface 13a and the lower surface 13b of the weld portion 13.

In the graph of FIG. 23B, a peak Pe11 occurring first is based on the reflected wave RW from the upper surface 11a. A peak Pe12 occurring second is based on the reflected wave RW from the lower surface 11b. The times when the peak Pe11 and the peak Pe12 are detected correspond respectively to the positions in the Z-direction of the upper surface 11a and the lower surface 11b of the metal plate 11. A time difference TD1 between the time when the peak Pe11 is detected and the time when the peak Pe12 is detected corresponds to a distance Di1 in the Z-direction between the upper surface 11a and the lower surface 11b.

Similarly, in the graph of FIG. 23C, a peak Pe13 occurring first is based on the reflected wave RW from the upper surface 13a. A peak Pe14 occurring second is based on the reflected wave RW from the lower surface 13b. The times when the peak Pe13 and the peak Pe14 are detected correspond respectively to the positions in the Z-direction of the upper surface 13a and the lower surface 13b of the weld portion 13. A time difference TD2 between the time when the peak Pe13 is detected and the time when the peak Pe14 is detected corresponds to a distance Di2 in the Z-direction between the upper surface 13a and the lower surface 13b.

The processing device 110 determines whether or not the time difference between the peaks corresponds to the thickness of the weld portion 13 for each of multiple points in the X-Y plane. When the time difference between the peaks is determined to correspond to the thickness of the weld portion 13, it is determined that the weld is joined at that point. A cluster of points where it is determined that the weld is joined corresponds to the weld portion 13. Therefore, the diameter of the weld portion 13 can be calculated based on the size of the cluster of points. For example, the processing device 110 determines the goodness of the weld by comparing the calculated diameter of the weld portion 13 to a preset threshold.

Also, there are cases where the upper surface 13a and the lower surface 13b of the weld portion 13 are tilted with respect to the upper surface 11a of the metal plate 11. This is due to the weld portion 13 including the solidified portion 14, shape deformation in the welding process, etc. In such a case, it is desirable for the ultrasonic wave US to be transmitted along a direction that is perpendicular on average to the upper surface 13a or the lower surface 13b. Thereby, the ultrasonic wave can be reflected more strongly at the upper surface 13a and the lower surface 13b, and the accuracy of the inspection can be increased.

Modifications

The inspection of the weld portion described above may be performed automatically by a robot.

Figure 24:
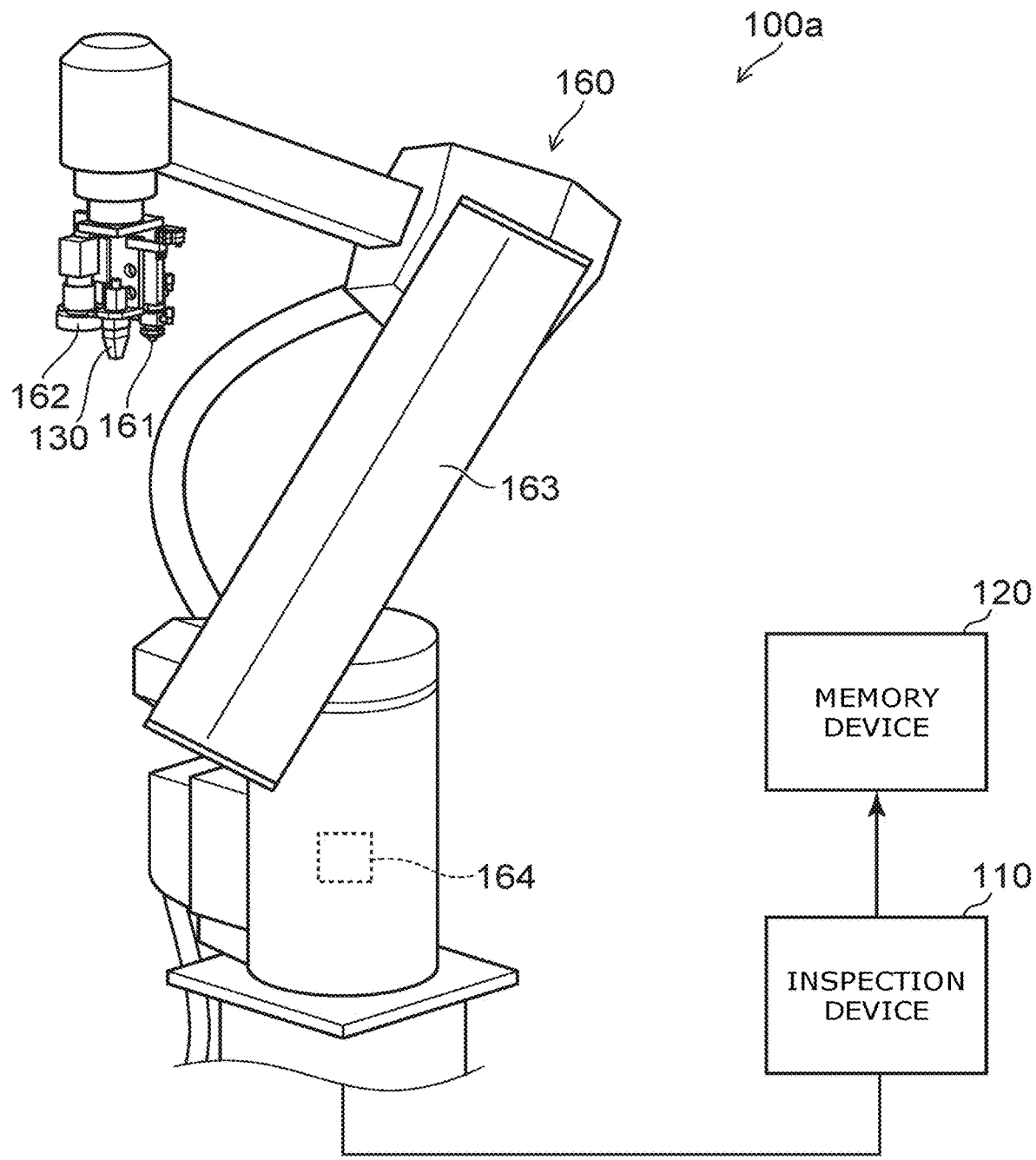
FIG. 24 is a schematic view illustrating a configuration of a processing system according to a modification of the embodiment.

FIG. 24 is a schematic view illustrating a configuration of a processing system according to a modification of the embodiment.

Figure 25:
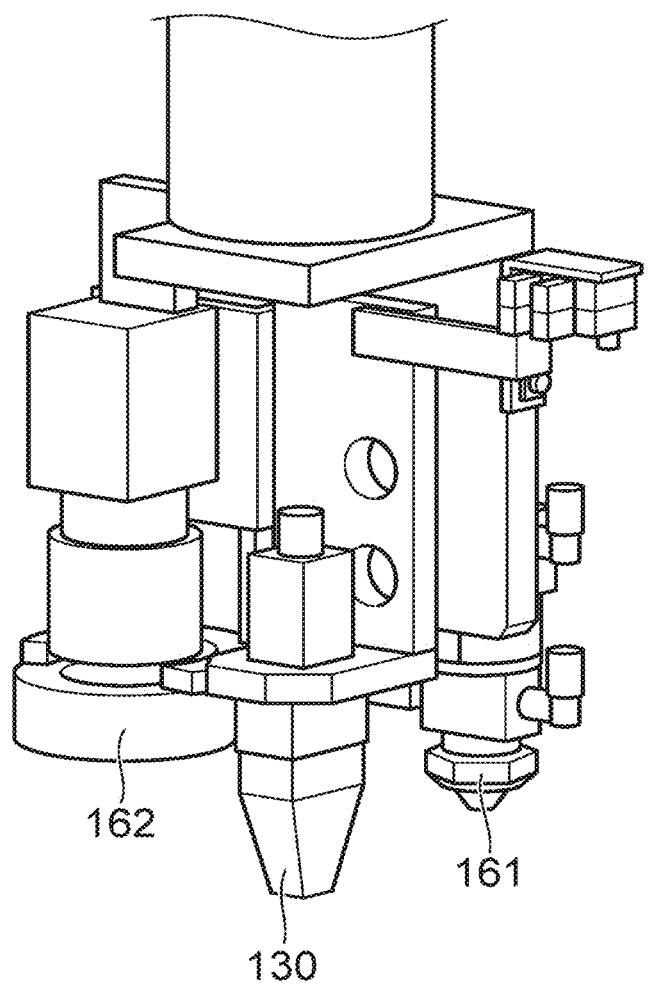
FIG. 25 is a perspective view illustrating a portion of the processing system according to the modification of the embodiment.

FIG. 25 is a perspective view illustrating a portion of the processing system according to the modification of the embodiment.

The processing system 100a illustrated in FIG. 24 includes the processing device 110 and a robot 160. The robot 160 includes the detector 130, an imaging device 161, a coating apparatus 162, an arm 163, and a control device 164.

The imaging device 161 acquires an image by imaging the welded member. The imaging device 161 extracts a weld mark from the image and detects roughly the position of the weld portion 13. The coating apparatus 162 coats a couplant onto the upper surface of the weld portion 13.

The detector 130, the imaging device 161, and the coating apparatus 162 are provided at the tip of the arm 163 as illustrated in FIG. 25. The arm 163 is, for example, a 6-DOF (Degree of Freedom) vertical articulated robot including multiple links and multiple rotation axes. The arm 163 includes multiple actuators (for example, motors). The multiple actuators respectively drive the multiple rotation axes. The detector 130, the imaging device 161, and the coating apparatus 162 can be displaced by driving the arm 163. The control device 164 controls the operations of the components (the detector 130, the imaging device 161, the coating apparatus 162, and the arm 163) of the robot 160.

Figure 26:
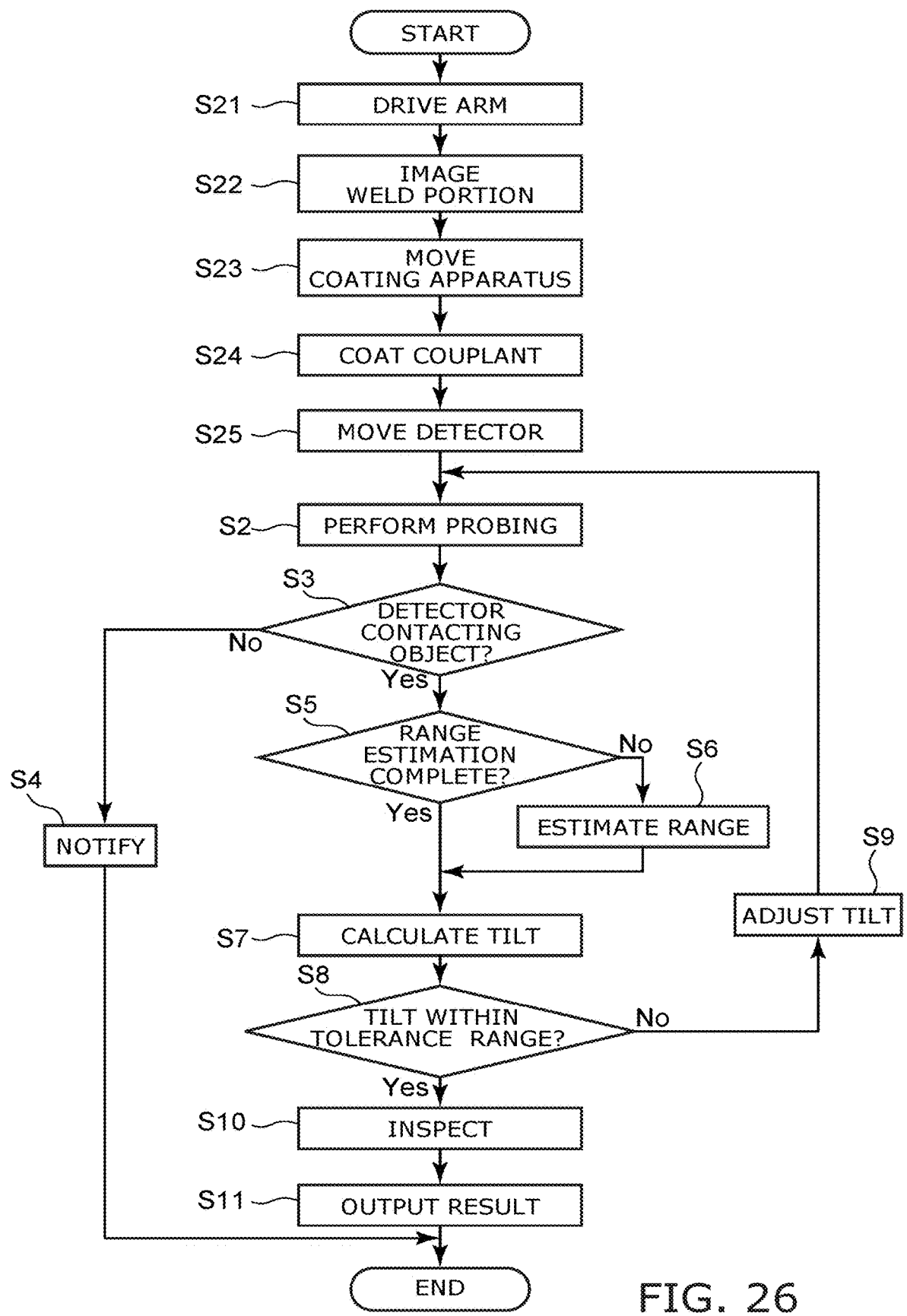
FIG. 26 is a flowchart illustrating an operation of the processing system according to the modification of the embodiment.

FIG. 26 is a flowchart illustrating an operation of the processing system according to the modification of the embodiment.

First, before the operation of the processing system 100a, a condition for determining the contact of the detector 130 with the welding object is preset. The method for setting the condition is as described above. After setting of the condition, the processing device 110 transmits the coordinates of the weld portion 13 stored in the memory device 120 to the control device 164. The control device 164 moves the tip of the arm toward the received coordinates by driving the arm 163 (step S21). When the detector 130 is moved to the vicinity of the received coordinates, the imaging device 161 images the member 10, and the detailed position of the weld portion 13 is detected from the acquired image (step S22). The control device 164 moves the coating apparatus 162 to the vicinity of the detected position by driving the arm 163 (step S23). The coating apparatus 162 coats the couplant onto the weld portion 13 (step S24). The control device 164 drives the arm 163 and moves the detector 130 so that the tip of the detector 130 contacts the weld portion 13 coated with the couplant (step S25). Hereinafter, steps S2 to S11 are performed similarly to steps S2 to S11 of the flowchart illustrated in FIG. 11.

When it is determined that the detector 130 does not contact the welding object as a result of the first determination of step S3, the processing system 100a may perform an operation other than a notification. For example, the processing system 100a may move the tip of the detector 130 further toward the weld portion imaged in step S22. There is a possibility that erroneous detection of the position of the weld portion may occur due to how the light strikes the weld portion when imaging. There is a possibility that the tip of the detector 130 may contact the weld portion appropriately by moving the tip of the detector 130. Or, the processing system 100a may re-perform step S22. At this time, the processing system 100a may modify the condition of the image processing, the condition of the position detection of the weld portion, etc., from the directly-previous condition. Thereby, the position of the weld portion may be detected more accurately. After the position of the weld portion is detected, for example, step S23 and subsequent steps are re-performed. In addition to these operations, the processing system 100a also may perform a notification.

In the processing system 100a according to the modified example, instead of the arm 163, another movable mechanism having two or more DOF may be provided. The movable mechanism includes an actuator. The probe 130 is attached to the movable mechanism. For example, the movable mechanism includes at least one selected from a 6-DOF parallel link mechanism, a 6-DOF horizontal articulated mechanism, and a 2-DOF gonio head. The control device 164 controls and drives the movable mechanism. By driving the movable mechanism, the tilt of the detector 130 changes. When the DOF of the movable mechanism is less than 6-DOF, the member 10 is preferably transported by a transport mechanism (not shown) so as to come into contact with the detector 130. The operation of the transport mechanism may be controlled based on the result of the first determination.

Figure 27:
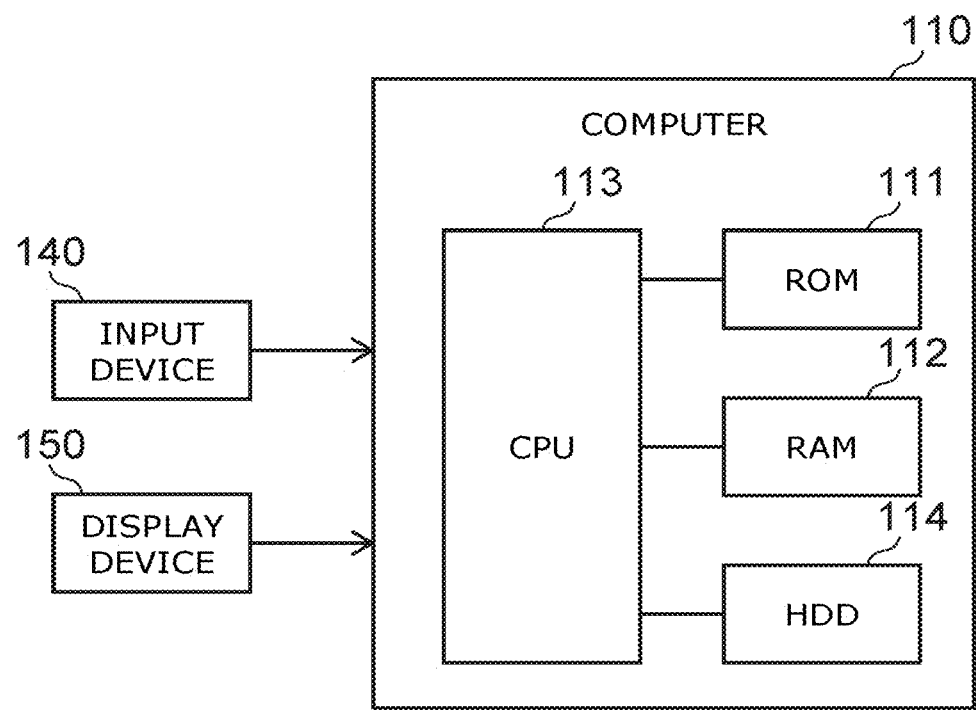
FIG. 27 is a block diagram illustrating a hardware configuration of the system.

FIG. 27 is a block diagram illustrating a hardware configuration of the system.

For example, the processing device 110 of the processing system 100 according to the embodiment is a computer and includes ROM (Read Only Memory) 111, RAM (Random Access Memory) 112, a CPU (Central Processing Unit) 113, and a HDD
(Hard Disk Drive) 114.

The ROM 111 stores programs controlling the operations of the computer. The ROM 111 stores programs necessary for causing the computer to realize the processing described above. The RAM 112 functions as a memory region where the programs stored in the ROM 111 are loaded. The CPU 113 includes a processing circuit. The CPU 113 reads a control program stored in the ROM 111 and controls the operation of the computer according to the control program. Also, the CPU 113 loads various data obtained by the operation of the computer into the RAM 112. The HDD 114 stores data necessary for reading and data obtained in the reading process. For example, the HDD 114 functions as the memory device 120 illustrated in FIG. 1.

Instead of the HDD 114, the processing device 110 may include an eMMC (embedded Multi Media Card), a SSD (Solid State Drive), a SSHD (Solid State Hybrid Drive), etc.

The processing and the functions of the processing device 110 may be realized by collaboration between more computer.

The input device 140 includes at least one of a mouse, a keyboard, or a touchpad. The display device 150 includes at least one of a monitor or a projector. A device such as a touch panel that functions as both the input device 140 and the display device 150 may be used.

In the example described above, the weld portion 13 that is spot-welded by the processing system 100 or 100a is inspected. The welding method is not limited to the example; a member that is welded using another method may be inspected by the processing system 100 or 100a. For example, the processing system 100 or 100a may inspect a member that is subjected to arc welding, laser welding, or seam welding. A non-destructive inspection that uses the detector 130 is possible for members welded by these methods as well.

By using the processing system and the processing method according to the embodiments described above, the contact of the detector with the welding object can be determined with higher accuracy. By performing the contact determination of the detector with the welding object, the accuracy of the calculation of the tilt or the inspection performed subsequently can be increased. Also, similar effects can be obtained by using a program for causing a computer to operate as the processing system.

The processing of the various data recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the data that is recorded in the recording medium can be read by a computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A processing device, being configured to:
   acquire a detection result when a reflected wave is detected by a detector, the detector including a plurality of detection elements arranged in a first direction, the detector transmitting an ultrasonic wave toward a welding object and detecting the reflected wave;
   extract a portion from the detection result in which a multiple-reflection wave is detected; and
   perform at least a first determination of determining whether or not the detector contacts the welding object, the first determination being based on the reflected wave in the extracted portion.

2. The device according to claim 1, wherein
   when determining that the detector contacts the welding object, the processing device is configured to calculate a tilt of the detector with respect to the welding object or inspects the welding object based on the detection result.

3. The device according to claim 1, wherein
   when determining that the detector contacts the welding object, the processing device configured to calculate a tilt of the detector with respect to the welding object or inspects the welding object based on the detection result used in the first determination.

4. The device according to claim 1, wherein the processing device is configured to perform the first determination by comparing a first determination value to a first threshold, the first threshold being preset, the first determination value being calculated by summing or averaging intensities of reflected waves in the extracted portion.

5. The device according to claim 4, wherein the processing device is configured to:
   extract a first portion from a first detection result in which a multiple-reflection wave is detected and calculate a first reference value by averaging or summing the intensities of the reflected waves in the first portion, the first detection result being of the reflected waves when the detector is caused to contact a member;
   extract a second portion from a second detection result in which a multiple-reflection wave is detected and calculate a second reference value by averaging or summing the intensities of the reflected waves in the second portion, the second detection result being of the reflected waves when the detector is separated from the member; and
   set the first threshold to be between the first reference value and the second reference value.

6. The device according to claim 1, wherein the processing device is configured to perform the first determination by comparing an interval of a peak, a position of a peak, or a position of a spectrum of a reflected wave included in the detection result to a condition, the condition being preset.

7. The device according to claim 1, wherein the processing device is configured to notify a user when the detector is determined not to contact the welding object.

8. A processing system, comprising:
   the processing device according to claim 1;

a movable mechanism including an actuator, the detector being attached to the movable mechanism; and
a control device controlling the detector.

9. The device according to claim 1, further comprising:
a display device configured to display a user interface including an image of the detection result.

10. The device according to claim 9, wherein
the processing device is configured to accept a designation of a range input by a user for the image in the user interface, and
the processing device is configured to perform the first determination by comparing a first determination value to a first threshold, the first threshold being preset, the first determination value being calculated by summing or averaging intensities of reflected waves in a designated range.

11. A processing method, comprising:
acquiring a detection result when a reflected wave is detected by a detector, the detector including a plurality of detection elements arranged in a first direction, the detector transmitting an ultrasonic wave toward a welding object and detecting the reflected wave;
extracting a portion from the detection result in which a multiple-reflection wave is detected; and
performing at least a first determination of determining whether or not the detector contacts the welding object, the first determination being based on the reflected wave in the extracted portion.

12. The method according to claim 11, wherein
when the detector is determined to be contacting the welding object, a calculation of a tilt of the detector with respect to the welding object or an inspection of the welding object is performed based on the detection result.

13. The method according to claim 11, wherein the first determination is performed by comparing an interval of a peak, a position of a peak, or a position of a spectrum of a reflected wave included in the detection result to a condition, the condition being preset.

14. A non-transitory computer-readable storage medium storing a program, the program causing a computer to:
acquire a detection result when a reflected wave is detected by a detector, the detector including a plurality of detection elements arranged in a first direction, the detector transmitting an ultrasonic wave toward a welding object and detecting the reflected wave;
extract a portion from the detection result in which a multiple-reflection wave is detected; and
perform at least a first determination of determining whether or not the detector contacts the welding object, the first determination being based on the reflected wave in the extracted portion.

15. The storage medium according to claim 14, wherein
when the detector is determined to be contacting the welding object, the program causes the computer to calculate a tilt of the detector with respect to the welding object or an inspection of the welding object based on the detection result.

16. The storage medium according to claim 14, wherein the program causes the computer to perform the first determination by comparing an interval of a peak, a position of a peak, or a position of a spectrum of a reflected wave included in the detection result to a condition, the condition being preset.

* * * * *